United States Patent [19]

Bishop et al.

[11] Patent Number: 4,914,653
[45] Date of Patent: Apr. 3, 1990

[54] INTER-PROCESSOR COMMUNICATION PROTOCOL

[75] Inventors: Thomas P. Bishop, Aurora; Mark H. Davis, Warrenville, both of Ill.; David N. Horn, Rumson, N.J.; Grover T. Surratt, West Chicago; Lawrence A. Welsch, Naperville, both of Ill.

[73] Assignee: American Telephone and Telegraph Company, New York, N.Y.

[21] Appl. No.: 941,702

[22] Filed: Dec. 22, 1986

[51] Int. Cl.[4] .............................................. H04J 3/02
[52] U.S. Cl. ................................ 370/85.6; 340/825.5
[58] Field of Search .................... 370/94, 85, 89, 85.1, 370/85.6; 340/825.5, 825.51

[56] References Cited

U.S. PATENT DOCUMENTS

| 4,228,496 | 10/1980 | Katzman et al. | 364/200 |
|---|---|---|---|
| 4,384,323 | 5/1983 | Ahuja | 364/200 |
| 4,514,728 | 4/1985 | Ahuja | 340/825.5 |
| 4,530,051 | 7/1985 | Johnson et al. | 364/200 |
| 4,581,734 | 4/1986 | Olson et al. | 370/85 |
| 4,714,923 | 12/1987 | Tassle et al. | 340/825.5 |
| 4,719,621 | 1/1988 | May | 370/94 |
| 4,734,696 | 3/1988 | Rogers | 340/825.51 |
| 4,814,974 | 3/1989 | Narayanan et al. | 340/825.51 |

OTHER PUBLICATIONS

A. Z. Spector, "Performing Remote Operations Efficiently on a Local Computer Network", *Comms. of the ACM*, vol. 25, No. 4 (4–82) pp. 246–260.
B. J. Nelson, *Remote Procedure Call*, Doctoral Dissertation, Carnegie-Mellon University, 1981.
S. R. Ahuja, "S/NET: A High-Speed Interconnect for Multiple Computers", *IEEE Journal on Selected Areas in Comms.*, vol. SAC-1, No. 5, (11–83) pp. 751–756.
*The X.25 Protocol and Seven Other Key CCITT Recommendations*: Lifetime Learning Publications (1981) pp. 52–142.
R. J. Deasington, *X.25 Explained*, Ellis Horwood Ltd. (1985) pp. 69–70.

Primary Examiner—Douglas W. Olms
Assistant Examiner—Min Jung
Attorney, Agent, or Firm—David Volejnicek

[57] ABSTRACT

Processors (101) of a multiprocessor system (FIG. 1) communicate across bus (150) via a low-latency packet protocol featuring per-logical channel input queues (143) and output queues (144), different per-processor priorities for sending data packets (FIG. 10) and data packet-acknowledging "quick" messages (FIG. 11), and separate buffers (923; 918) for receiving data packets and "quick" messages, respectively. Transmitted data packets afflicted by error, receive buffer overflow, and input queue-full conditions are discarded by the receiving processor and are retransmitted by the sending processor.

34 Claims, 22 Drawing Sheets

PACKET

QUICK MESSAGE

BUS SEND
FINITE STATE MACHINE

BUS RECEIVE
FINITE STATE MACHINE

INTER-PROCESSOR COMMUNICATION PROTOCOL

TECHNICAL FIELD

The invention relates generally to interprocessor communications, and concerns particularly protocols for such communications.

BACKGROUND OF THE INVENTION

In a multiprocessor computing system, a plurality of processors cooperate with each other in performing system tasks. Cooperation involves the exchange of information; hence, a significant portion of the processors' activities comprises inter-processor communications. The speed and efficiency with which the communications are performed directly and significantly affect the performance of the system. Hence, the latency of the inter-processor communication mechanism, which is the elapsed time required to transmit a communication from one processor to another and to get a response back, must be made as short as possible.

Existing protocols typically do not minimize latency. For example, in many communication protocols currently enjoying popularity, the data which are being communicated are transferred through a plurality of protocol layers. The data are transformed several times as they descend and ascend the layers of the protocol. Each transformation adds to the overhead of the protocol, increasing latency and decreasing throughput. For another example, many existing protocols include extensive and complex error-recovery strategies and slow communication acknowledgment procedures to deal with communications that become either lost or garbled during transmission. To limit the cost of implementing the error-recovery strategies, the protocols typically implement them in software. The complexity of the strategies, combined with the slowness of software implementations, likewise add to the overhead of the protocol and increase latency at the expense of throughput. To limit the cost of implementing acknowledgment procedures, protocols typically use a single acknowledgment to serve to acknowledge a plurality of communications, and also "piggyback" acknowledgments onto other communications. The effect is again an exacerbation of the latency problem due to delays in acknowledgment.

In summary, then, a problem in the art is the lack of a communication protocol optimized for minimum latency.

SUMMARY OF THE INVENTION

This invention is directed to solving this and other problems and disadvantages of the prior art. According to the invention, in a communication system having a communication medium and a plurality of stations communicatively connected to the medium, each station has assigned thereto two priorities for seeking access to the medium: a lower priority for transmitting regular-type messages and a higher priority for transmitting acknowledgment-type "quick" messages. In this arrangement, acknowledgments have top priority and hence minimum delay, thereby minimizing latency. Illustratively, an acknowledgment—whether a "quick" message or some other signal—of a regular message is returned to the sending station by a receiving station either during, or following, transmission of every regular packet. An acknowledgment thus need not await another communication to "piggyback" on, nor are a plurality of acknowledgments saved and "batched" into a single communication. Rather, acknowledgments are advantageously returned as soon as possible, thereby minimizing latency. Furthermore in accordance with the invention, at a receiving station, the acknowledgment-bearing "quick" messages are buffered—received and temporarily stored—separately from regular messages. "Quick" messages may thus advantageously be accessed and processed at the receiving station independently of other arriving regular messages, without the necessity of processing all regular messages that were buffered prior to the "quick" messages before the "quick" messages can even be accessed (such as would be true in the typical first-in, first-out buffering arrangements, for example). In this manner, acknowledgments are again given priority over other communications and are made available for processing as soon as possible, thereby minimizing latency.

Acknowledgments serve to ensure end-to-end correctness of transferred data. Illustratively, acknowledgments are provided by means of two separate mechanisms, both optimized to provide the acknowledgment as soon as possible. While a message is being received, it is monitored for error conditions and the receive buffer is monitored for overflow. Occurrence of either condition results in immediate transmission of a negative acknowledgment (RNACK) signal back to the sending station before control of the medium is released. Hence, advantageously, the receiving station need not contend for medium access before it can send the RNACK signal. If an RNACK signal is not sent during reception of the message, positive or negative acknowledgment is provided during processing of the received message by means of the "quick" message mechanism described above. Not only does the "quick" message mechanism minimize latency in the manner described above, but it also advantageously minimizes the latency of other communications, including other "quick" messages, by leaving the medium free for transmission of the other communications between the time when a message is received and the time when it is processed.

Further according to the invention, there are provided input queues and output queues for regular messages. The queues serve as a simple mechanism for maintaining the order of sent and received messages. User queues are provided on a per-logical channel basis. Per-channel input queues allow movement of data contained by received packets directly from the receiving buffer to their final destinations, illustratively located in the main memory of the station, advantageously without interfering with, or waiting upon, the operation of communicating entities, which then call for the received data at their leisure. And per-channel output queues allow each communicating entity to asynchronously add communication requests to output queues advantageously without interfering with other communicating entities and with the communication control mechanism. Elimination of such interference lowers system overhead and hence also decreases latency.

Entries of the input and the output queues do not hold packets, but only representations of packets. Particularly, user data to be communicated by packets is stored elsewhere, illustratively in main memory of the station, and the entries merely store pointers to the data. Packets for transmission are assembled only in a send buffer from which they are directly transmitted on the medium, and packets received by the receive buffer are disassembled immediately upon being read from the receive buffer. Transformations and copying of the data between protocol layers are thereby advantageously avoided, and latency is consequently decreased.

Complex error-recovery strategies are also avoided. Received messages found to be affected by undesirable conditions, such as parity error, receive buffer overflow, and input queue full conditions, are merely discarded at the receiving station and, by means of a negative acknowledgment "quick" message or RNACK signal, are caused to be retransmitted by the sending station. The simplicity of this procedure avoids the complexity and cumbersomeness of other error-recovery strategies and thus also serves to decrease latency of communications. This solution is optimal, from a latency standpoint, for the case where the number of failures is small and hence the retransmit overhead is small.

The invention as claimed is directed to a station for, and to a method of communicating in, the above-characterized system. Broadly according to the invention, a station comprises a first arrangement (illustratively an arbiter) for seeking access to the communication medium according to either one of two priorities associated with the station, and separate storage (illustratively a receive FIFO and a "quick" message register) for the two types of messages (illustratively, regular and "quick" message packets) received on the medium from other stations. A second arrangement (illustratively a control unit of a sending station) responds to gaining of sought access by the first arrangement by transmitting messages of either type on the medium to other stations. A third arrangement (illustratively an output processing portion of an MSBI unit) causes the first arrangement to seek medium access according to the lower priority and causes the second arrangement to transmit a message of one type (illustratively a regular message). A fourth arrangement (illustratively an input processing portion of an MSBI unit) responds to a message received from a second station and stored in a storage for regular messages (receive FIFO), by causing the first arrangement to seek medium access according to the higher priority and causes the second arrangement to transmit a message of the other type (illustratively a "quick" message).

Preferably, a fifth arrangement (illustratively included in a control unit of a receiving station) determines whether a message being stored in the storage for regular messages (receive FIFO) is affected by a condition of a first type (illustratively a parity error or receive FIFO overflow). If so, a sixth arrangement (illustratively also included in the control unit of a receiving station) sends a signal (illustratively RNACK) on the medium. The affected message is eventually discarded. A seventh arrangement (illustratively included in the input processing portion of an MSBI unit) responds to receipt of the signal on the medium, by causing retransmission of the regular message that was being transmitted by this station when the signal was received.

Also preferably, a station includes storage (illustratively input queues) for information that represents messages removed from the store for received regular messages (receive FIFO). An arrangement (illustratively the input processing portion of an MSBI unit) determines whether a message removed from the store for received regular messages is affected by a condition of a second type (illustratively a parity error, storage overflow, or input queue full). If so, the message is discarded, and if the sixth arrangement (receiving station control unit) sent no signal during reception of the message, the fourth arrangement (MSBI input processing portion) causes to be sent a "quick" message bearing a negative acknowledgment. If the message is not affected by a second-type condition, an arrangement (MSBI input processing portion) stores information representing the message in the storage for message-representing information (an input queue), and the fourth arrangement causes to be sent a "quick" message bearing a positive acknowledgment.

Receipt of a negative acknowledgment "quick" message results in eventual retransmission of the acknowledged message. Illustratively, the station includes a plurality of output queues each for association with a different logical communication path extending to input queues of other stations. Each output queue stores entries each of which defines a regular packet for transmission across the associated logical path to the input queue at the other end of the path. Regular messages transmitted by the second arrangement (sending station control unit) are formed from these entries and identify the associated logical path (illustratively by identifying a port of that path). In an exemplary embodiment, a received "quick" message identifies the particular logical communication path of the regular message that is being acknowledged. Receipt of a negative acknowledgment results in temporary suspension of formation and transmission of packets from entries of the output queue (corresponding to that particular logical communication path) that includes the entry of the acknowledged packet. Receipt of a positive acknowledgment results in deletion from the output queue of the entry representing the acknowledged packet.

Broadly according to the invention, the method of communicating between a plurality of the above-described stations comprises the following steps. A first station seeks access to the medium according to a first, lower, priority associated with the station, and upon gaining the access, transmits a message of the first type on the medium to a second station. The second station receives the transmitted message in storage for messages of the first type, and in response to the message seeks access to the medium according to a second, higher, priority associated with the station, and transmits a message of the second type on the medium to the first station. The first station receives the message in storage for messages of the second type. Furthermore, if the message of the second type is a negative-acknowledgment bearing message, the message of the first type being acknowledged thereby will have been discarded at the second station, so the first station eventually—illustratively in response to yet another message received from the second station—repeats the first two steps to retransmit the message of the first type to the second station.

The summarized station and method, and refinements thereof as described and claimed, provide the advantages enumerated in the characterization given initially. These and other advantages and features of the present invention will become apparent from the following description of an illustrative embodiment of the invention taken together with the drawing.

DETAILED DESCRIPTION

SYSTEM STRUCTURE

Figure 1:
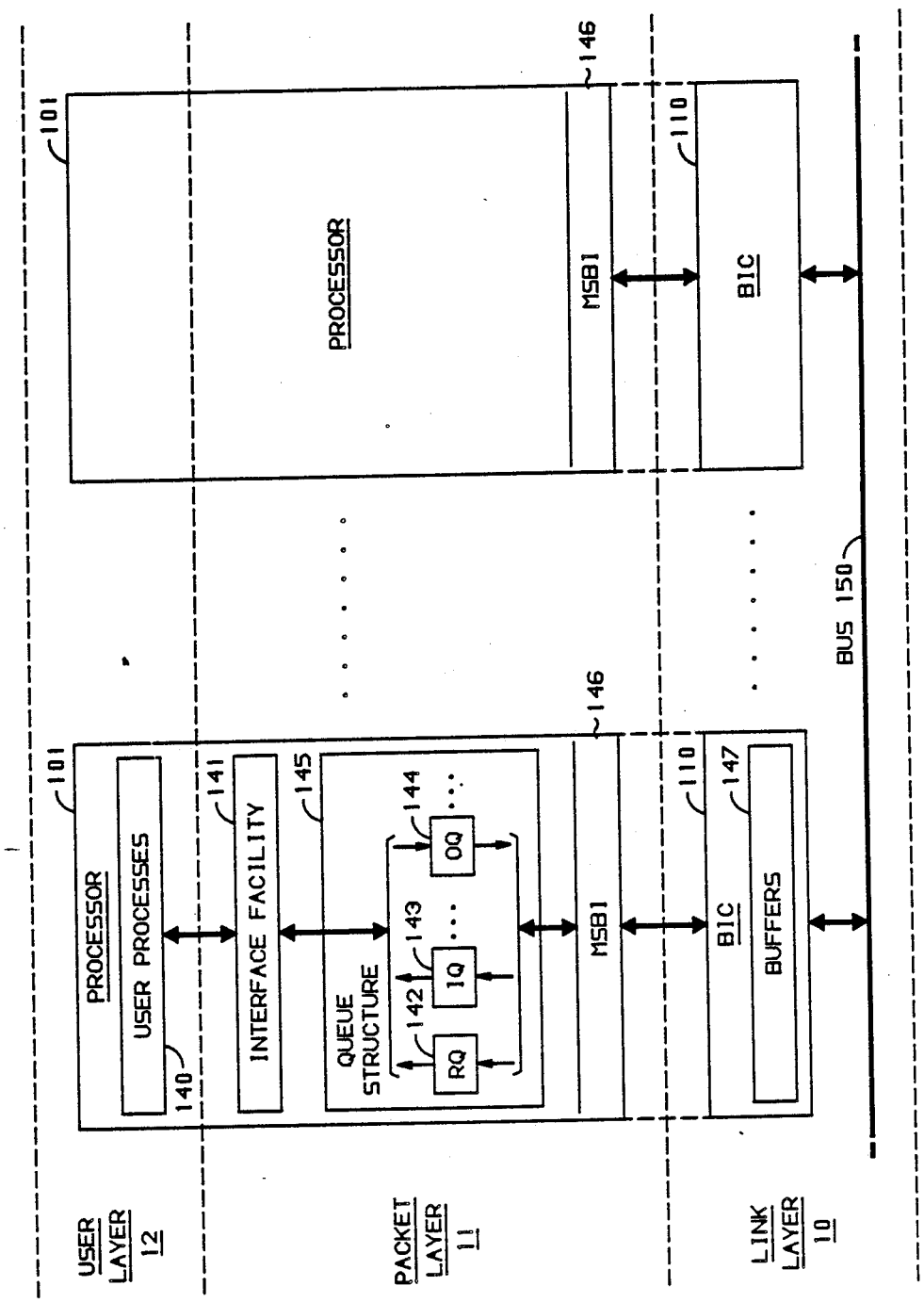
FIG. 1 a block diagram of a multiprocessor system embodying an illustrative implementation of the invention.

FIG. 1 shows a multiprocessor system implementing an illustrative embodiment of the invention. The multiprocessor comprises a plurality of processors 101 which, for purposes of this example, are considered to be—though need not be—identical. Processors 101 are communicatively interconnected by a bus 150. Each processor 101 is coupled to bus 150 by its own bus interface circuit (BIC) 110.

While only two processors 101 are shown in FIG. 1 for purposes of illustration, a larger number of processors 101, for example, more than 10, may be connected to bus 150 and use BICs 110 to interface to bus 150 as described herein. Processors 101 may, for example, be any number of different processors, such as WE® 32100 single board computers, or Motorol® 68000 single board computers, or AT&T 3B15 computers, or any other processors capable of communicating with bus 150 through circuitry such as BIC 110. Bus 150 is, in this example, a high-speed packet bus, such as the S/NET bus described in an article by S. R. Ahuja entitled "S/NET: A High-Speed Interconnect for Multiple Computers" in *IEEE Journal on Selected Areas of Communication*, Vol SAC-1, No. 5 (Nov. 1983).

Each processor 101 comprises a central processing unit (CPU) and a main store memory (not shown). The CPU and memory execute and store operating system and application processes, referred to herein commonly as user processes 140. User processes 140 of a processor 101 communicate with user process 140 of other processors 101 through buffers 147 of BIC 110. However, processes 140 do not have direct access to buffers 147, but only indirect access through a queue structure 145 implemented in the memory of processor 101.

Processes 140 may either access queue structure 145 directly, or they may do so indirectly through a shared interface facility 141. Illustratively, facility 141 is implemented as a device driver on processor 101. Queue structure 145 is in turn interfaced to buffers 147 of BIC 110 by a main store-to-BIC interface (MSBI) 146. MSBI 146 may be implemented either as a device driver on processor 101 or as a hardware unit separate from processor 101.

The above-described structure forms a three-layered communication protocol comprising a link layer 10, a packet layer 11, and a user layer 12. Link layer 10, formed by bus 150 and BICs 110, physically connects together processors 101. This layer is a simple first-in, first-out pipe between sending and receiving processors 101. It does not guarantee that all information has successfully been received at the other end. The packet layer, formed by MSBI 146, queue structure 145, and interface facility 141, does guarantee that all information has been correctly transmitted from the memory of a sending processor 101 into the memory of a receiving processor 101. It provides reliable one-way virtual communication channels between sending and receiving user processes 140. And user layer 12, formed by user processes 140, is the producer or consumer of communicated data. Illustratively, layer 12 comprises the UNIX® operating system of AT&T, plus processes of whatever application the multiprocessor system of FIG. 1 is being put to.

PACKET LAYER

Queue structure 145 comprises a plurality of input queues 143 by means of which user processes 140 receive communications from other processors 101, and a plurality of output queues 144 by means of which user processes 140 send communications to other processors 101. In the case where MSBI 146 is a separate hardware unit, queue structure 145 also includes a response queue 142. MSBI 146 uses queue 142 to send communications to interface facility 141.

Figure 2:
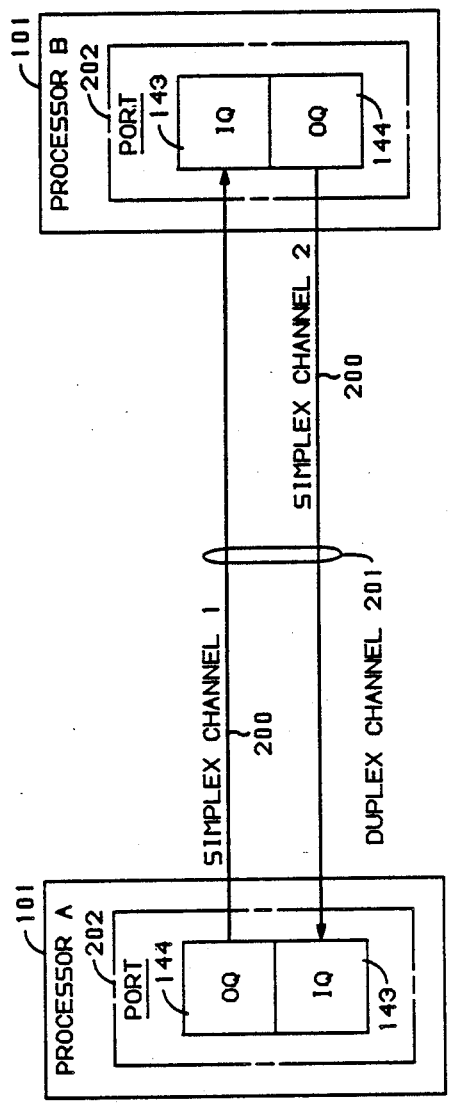
FIG. 2 shows in block diagram form the logical interprocessor communication structure of the system of FIG. 1.

FIG. 2 shows the logical inter-processor communication structure implemented by queue structure 145. Each simplex (one-way) virtual, or logical, communication channel 200 is a logical path, physically provided by bus 150, between two user processes 140 located on different processors 101. A simplex channel 200 is defined at one end by an output queue 144 of a sending processor 101 and at the other end by an input queue 143 of a receiving processor 101. A simplex channel 200 is set up by assignment of an input queue 143 and an output queue 144 thereto, and the assigned queues remain assigned to a simplex channel 200 for the duration of existence of the channel. When a simplex channel 200 is torn down, queues 143 and 144 assigned thereto become available for setting up new channels.

Having per-channel input queues allows MSBI 146 to move incoming data directly from BIC 110 to final destination buffers in the user address space of memory, without interfering with processes 140. And having per-channel output queues allows each user process 140 to asynchronously add work to its output queues without interfering with other processes 140 or MSBI 146. By grouping related entries in a fixed order in a private queue, speed mismatches between sending and receiving processes are easily handled, by delaying sending out of all remaining output queue entries in a particular output queue, when sending MSBI 146 receives an "input queue full" or "receive buffer overflow" indication (discussed later on).

A duplex channel (two-way inter-processor communication link) 201 between two processes 140 comprises two oppositely-directed simplex channels 200. Each duplex channel 201 terminates on a processor 101 at a port 202 comprising input queue 143 and output queue 144 of the duplex channel's member simplex channels 200.

Figure 3:
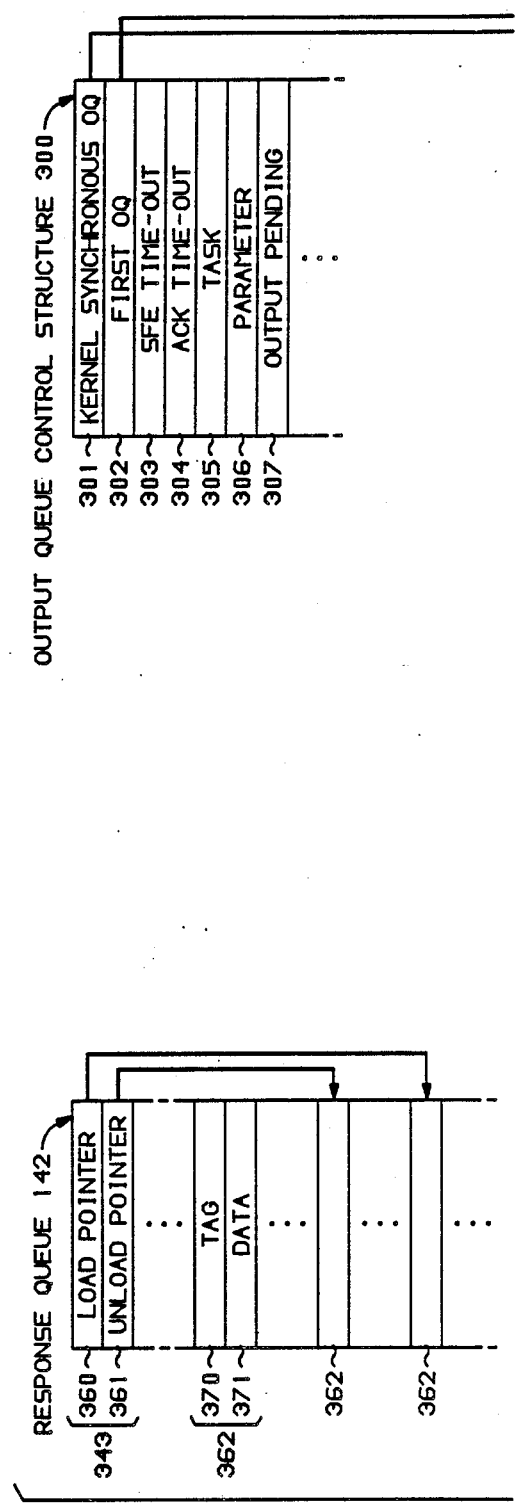
FIGS. 3-5 are a block diagram of the queue structure of the system of FIG. 1.
Figure 4:
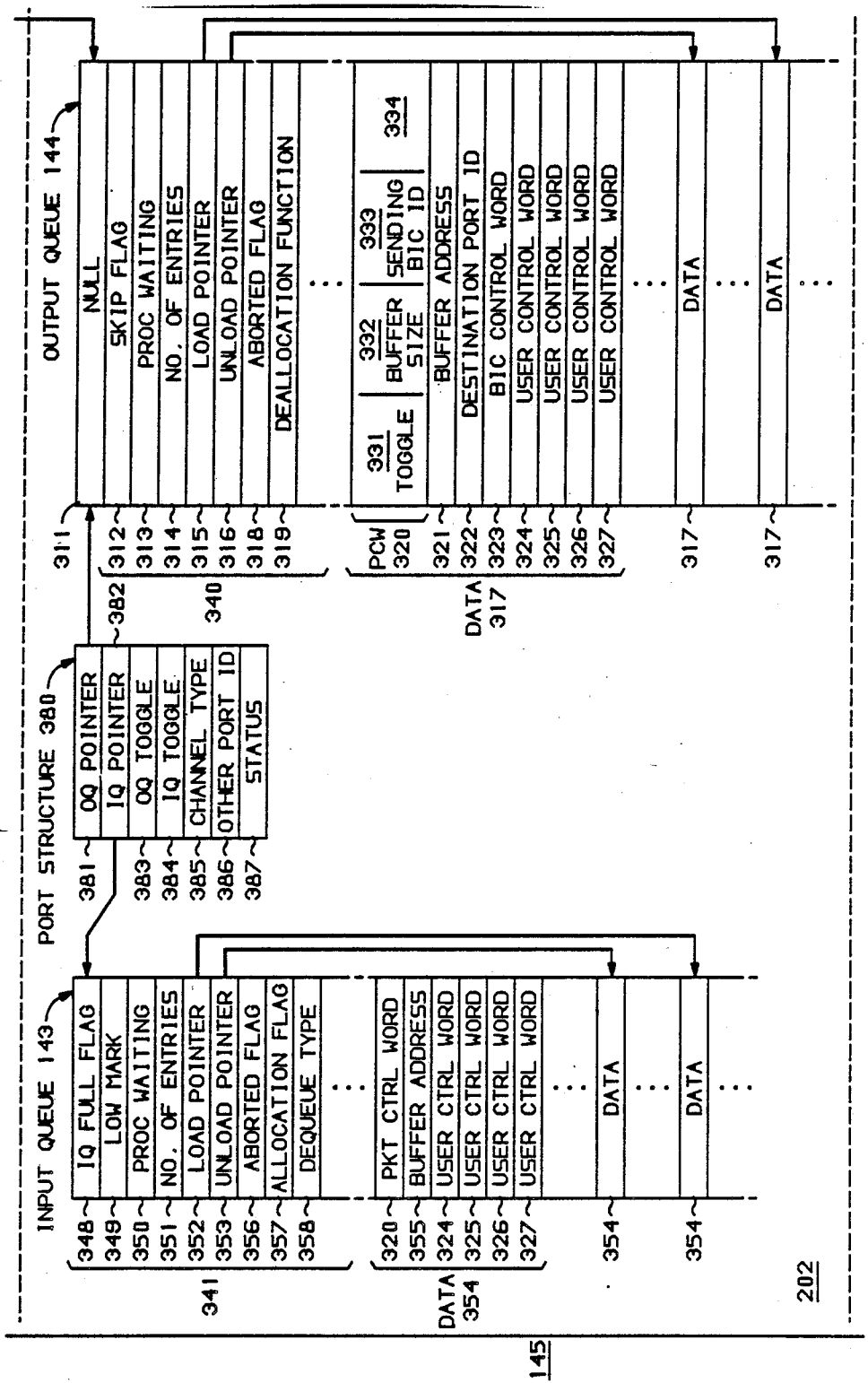
Figure 5:
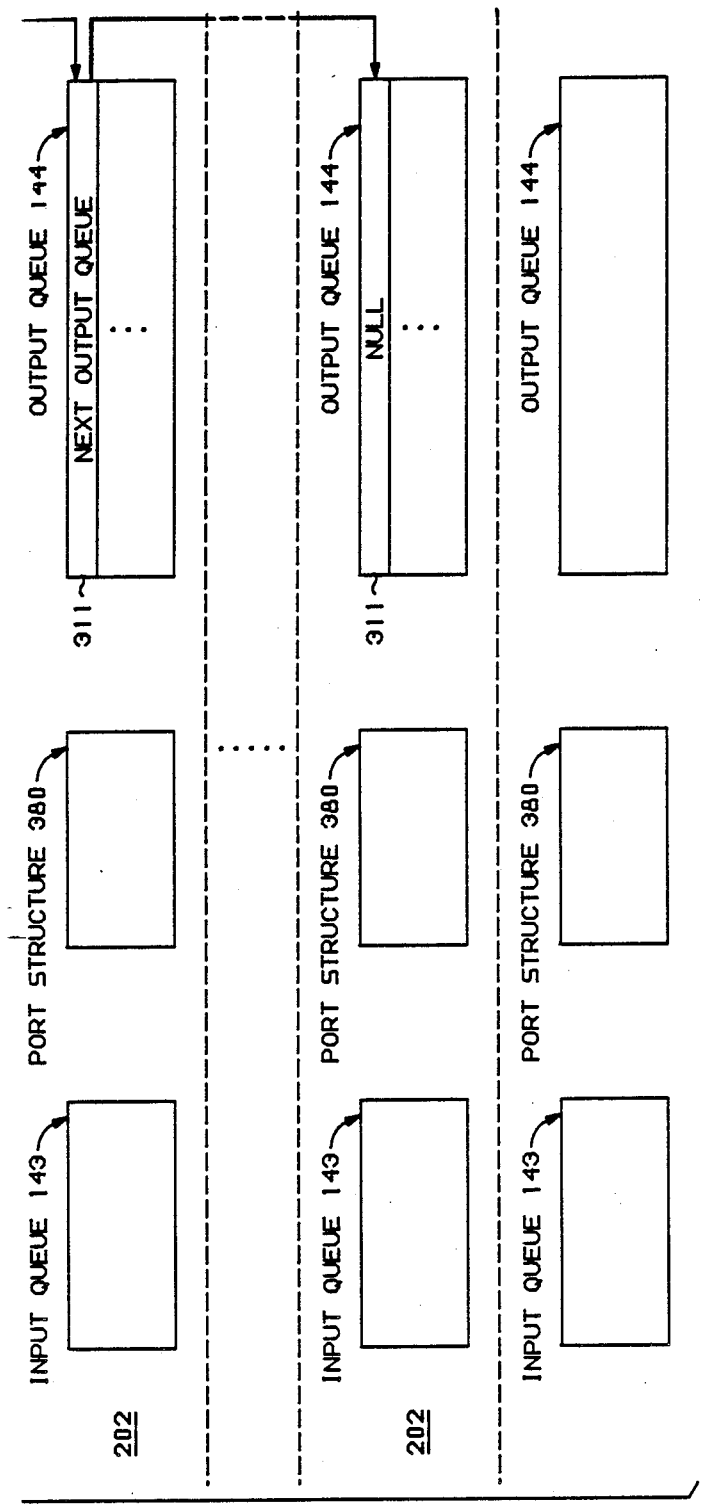

Queue structure 145 is shown in greater detail in FIGS. 3-5. Each port 202 has associated therewith a port structure 380. Port structure 380 includes output queue pointer 381 which points to header 340 of output queue 144 of associated port 202, and input queue pointer 382 which points to header 341 of input queue 143 of associated port 202. Together, entries 381 and 382 define port 202.

The queue structure 145 is created by the system at bootstrap time. However, input and output queue entries of user asynchronous channels are allocated and linked only when the port is actually allocated to a channel.

Port structure 380 also includes output queue toggle 383 which specifies the value of a toggle bit of the next packet to be loaded into output queue 144 pointed to by pointer 381, and input queue toggle 384 which specifies the expected value of a toggle bit of the next received packet to be loaded into input queue 143 pointed to by pointer 382. Toggles 383 and 384 comprise a single bit for "user asynchronous" channels 201 and plural bits for "kernel synchronous" and "kernel asynchronous" channels 201, with one bit for each processor 101. (The above-mentioned channel types are described further below.) Toggles 383 and 384 are used to maintain integrity of data flowing over simplex channels 200 associated with port 202. The value of a toggle bit of packets successively transmitted across a simplex channel 200 alternates; if the toggle bit value of successively-received packets does not alternate, it is an indication of an error, such as the loss of an acknowledgment packet during transmission.

Port structure 380 also includes channel type indicator 385 which specifies the type of channel 201 that port 202 is associated with: kernel synchronous, kernel asynchronous, or user asynchronous. Structure 380 further includes other port ID 386 which identifies port 202 at the other end of the associated duplex channel 201. If indicator 385 identifies the associated channel 201 as user asynchronous, other port ID 386 holds the ID of the other port and thereby identifies it directly. If indicator 385 identifies the associated channel as a kernel channel, other port ID 386 identifies the other port indirectly, by pointing to an array (not shown) that indicates the other port on each processor 101. Structure 380 also includes status indicator 387 which shows the status of the associated port 202: allocated to a channel 201; connected to another port 202; disconnected, i.e., the destination processor is out of service; free, i.e., unused; or "zombie". A "zombie" port is one for which free status is desired, but the port cannot be freed yet because its associated output queue 144 is not empty.

Associated with output queues 144 is an output queue control structure 300 comprising items 301-306. Kernel synchronous output queue pointer 301 points to header 300 of output queue 144 of port 202 used by operating system kernel processes of user processes 140 for a kernel synchronous channel. The kernel synchronous channel supports a subroutine-call like interface between operating system kernels of processors 101. Once a kernel issues a kernel synchronous request to another processor, the kernel must wait for its response just like a subroutine call and return. The kernel cannot issue another kernel synchronous request while it has one pending. However, the kernel can issue responses to any kernel synchronous requests that it receives while it is waiting for its response. Because a processor cannot generate a new kernel synchronous request until its pending request has been responded to, there is only a single kernel synchronous duplex channel 201, and hence only one kernel synchronous port 202, on each processor 101. For the same reason, an "input queue full" condition cannot occur on the kernel synchronous channel 201. Kernel synchronous channel 201 input queue 143 and output queue 144 are allocated each with one data entry available for each processor 101 in the system. This allows a processor 101 to receive kernel synchronous requests while it is waiting for a kernel synchronous acknowledgment.

Returning to output queue control structure 300, first output queue pointer 302 points to the first output queue 144 on a linked list of output queues 144 of ports 202. Unused output queues 144 are not part of any port 202 and are therefore not on the linked list of output queues. Ports 202 other than kernel synchronous are used for "kernel asynchronous" and "user asynchronous" duplex channels 201. Kernel asynchronous channels 201 support a message-passing like interface, requiring no user layer acknowledgment, between operating system kernels of processors 101. They implement operating system services that do not wish to wait for an immediate response, or that have very long service times. User asynchronous channels 201 are channels between portions of a user process located on different processors.

Send FIFO empty (SFE) timeout indicator 303 specifies a maximum period of time that transmission of a packet from BIC 110 may take, and acknowledgment timeout indicator 304 specifies a maximum period of time for receipt of a packet acknowledgment from a receiving processor 101. Task indicator 305 specifies to MSBI 146 whether general processing is to be performed, and parameter indicator 306 specifies the parameters of that processing. Output pending indicator 307 is a flag that indicates whether output queues 144 have entries to be processed. Structure 300 may include other entries as well, as desired by a particular implementation.

Each output queue 144 includes a header 340 comprising items 311-316 and 318-319 that store global information (information common to all data entries of queue 144). Next output queue pointer 311 points to header 340 of next output queue in the linked list. This pointer is null for the kernel synchronous output queue 144, as this queue 144 is not on the general output queue linked list. Skip flag 312 is manipulated by MSBI 146 and indicates whether MSBI 146 should skip processing this output queue. Process waiting flag 313 indicates whether any process is waiting ("sleeping") on this output queue 144. Number of entries indicator 314 indicates the number of data entries 317 that exist on this queue; it is used for queue reallocation and deallocation purposes. Load pointer 315 points to the next data entry 317 available to be filled with an outgoing packet. And unload pointer 316 points to the next data entry 317 to be sent. Aborted flag 318 is periodically checked by the operating system kernel and indicates thereto whether channel 201 associated with this queue 144 was aborted while a kernel user process was sleeping on this queue 144. And deallocation function 319 is an optional indicator specifying a memory deallocation function to be used when deallocating public memory allocated to queue 144; it is null if queue 144 has memory allocated from private memory of interface facility 141. The header may include additional entries, again as desired by a particular implementation.

Each data entry 317 of an output queue 144 represents and defines a packet to be sent to another processor 101. Data entries 317 are multi-word entries. A packet control word (PCW) 320 comprises a toggle bit field 331, a buffer size field 332 that specifies the size of a buffer in memory containing packet data, a sending BIC ID field 333, and a field 334 that is empty in output queue 144. (In a packet, field 334 contains a quick message sequence number.) Buffer address word 321 specifies the address of the start of the buffer. Destination port ID word 322 specifies the ID of destination port 202 on destination processor 101. And, BIC control word 323 is a control word for BIC 110 specifying, inter alia, the destination processor 101. Illustratively, entry 317 also includes four user control words 324–327, one of which is used by the operating system kernel to specify packet type and as a flag field, and three of which are user-defined.

Data entries 317 need not be physically contiguous with each other and with header 340. Illustratively, data entries 317 are implemented as a circular linked list. In that case, header 340 also includes a pointer to the first entry 317 of the queue, and each entry 317 includes a pointer to the next entry 317 on the linked list.

Each input queue 143 includes a header 341 comprising items 348–353 and 356–358 having global information. Input queue full flag 348 indicates whether the queue is considered to be full. Low mark 349 indicates how many data entries 354 must be freed before a full queue is no longer considered to be full. Process waiting flag 350 indicates whether a process 140 is waiting on this input queue 143. Number of entries 351 indicates the number of data entries 354 that exist on queue 143. Load pointer 352 points to the next data entry 354 available to be filled with an incoming packet. And unload pointer 353 points to the last data entry 354 returned to a user 140. Aborted flag 356 is the input queue equivalent of aborted flag 318 of output queue 144. Allocation flag 357 specifies whether memory allocated to queue 143 is memory from private space of interface facility 141 or public memory allocated by the operating system kernel. And dequeue type indicator 358 specifies how data entries 354 are dequeued from queue 143: whether synchronously, by means of a function call in response to an interrupt; or asynchronously, directly by a user process 140. The header may include additional entries as well.

Data entries 354 are multi-word entries. Each data entry 354 represents a packet received from another processor 101. A data entry 354 comprises a packet control word 320 obtained from the received packet, and a buffer address word 355 which specifies the address in memory of the start of a buffer where data, received via the packet, are stored. A data entry 354 illustratively also includes four user control words 324–327 obtained from the received packet.

As in the case of output queue data entries 317, entries 354 need not be physically contiguous but may be implemented as a circular linked list. In that case, header 341 also includes a pointer to the first entry 354 of the queue, and each entry 354 includes a pointer to the next entry 354 on the linked list.

Response queue 142 includes a header 343 comprising load pointer 360 which points to the next response entry 362 to be filled, and unload pointer 361 which points to the last response entry 362 unloaded. Response entries 362 are single-word entries. A tag field 370 identifies the kind of entry—for example, whether it relates to an input queue or to an output queue—and thereby specifies the kind of data that data field 371 contains. Once again, response entries 362 need not be contiguous with header 343 or with each other.

Figure 6:
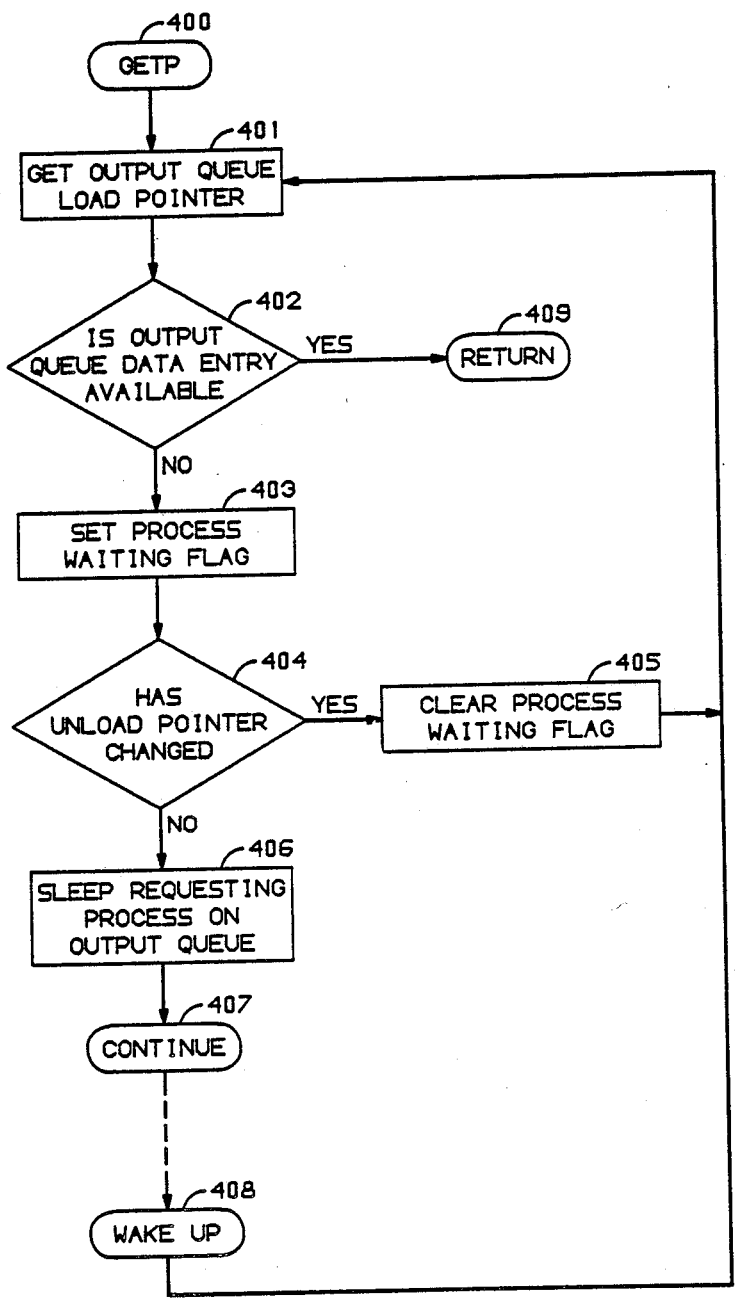
FIG. 6 is a flow diagram of the operation of an interface facility 141 of the system of FIG. 1 in responding to a GETP call.
Figure 7:
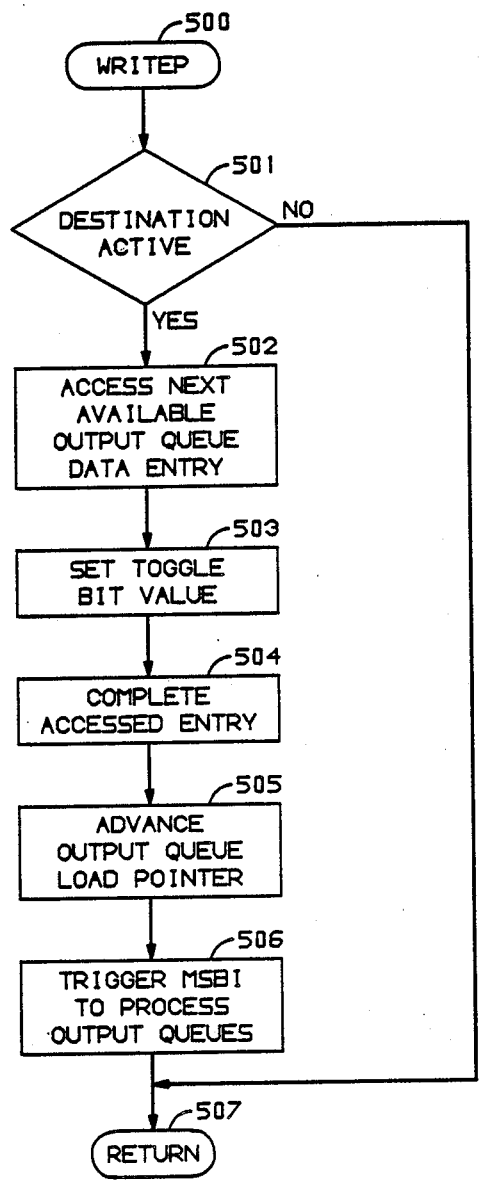
FIG. 7 is a flow diagram of the operation of an interface facility 141 of the system of FIG. 1 in responding to a WRITEP call.

FIGS. 6 and 7 flowchart the operation of interface facility 141 in sending a packet to another processor 101, and thereby illustrate use of output queues 144 of structure 145.

A user process 140 wishing to send a packet to another processor 101 first calls facility 141 via a GETP call, at step 400, to obtain an available data entry 317 of output queue 144. As part of the call, calling process 140 specifies port 202 from which it wants the packet transmitted.

In response to the call, facility 141 obtains load pointer 315 of the specified sending port 202, at step 401. Facility 141 does so by accessing port structure 380 of the specified sending port 202 to obtain therefrom output queue pointer 381, and then accesses header 340 of output queue 144 pointed to by pointer 381 to obtain load pointer 315. Interface facility 141 then checks whether an empty data entry 317 is available on this output queue 144, at step 402, by comparing that queue's load pointer 315 and unload pointer 316. If they are not equal, an entry 317 is available, and facility 141 returns load pointer 315 to calling user process 140, at step 409.

If load pointer 315 and unload pointer 316 are equal, output queue 144 is full. Facility 141 therefore sets process waiting flag 313 to indicate that a process 140 is waiting on this queue, at step 403. Facility 141 then checks the value of unload pointer 316 to determine if it has changed since the check at step 402, at step 404. A change indicates that a data entry 317 has been freed, so facility 141 clears process waiting flag 313, at step 405, and returns to step 401.

If the value of unload pointer 316 has not changed, output queue 144 remains full. Facility 141 therefore puts requesting process 140 to sleep on this output queue 144, at step 406, in a conventional UNIX system manner. Activities involved in putting a process to sleep include saving the processor state at the time the process is put to sleep, and appending the ID of the process to a list of sleeping processes associated with the address of this output queue. Interface facility 141 then continues with other operations, at step 407, such as responding to and processing other calls from other processes 140.

Figure 11:
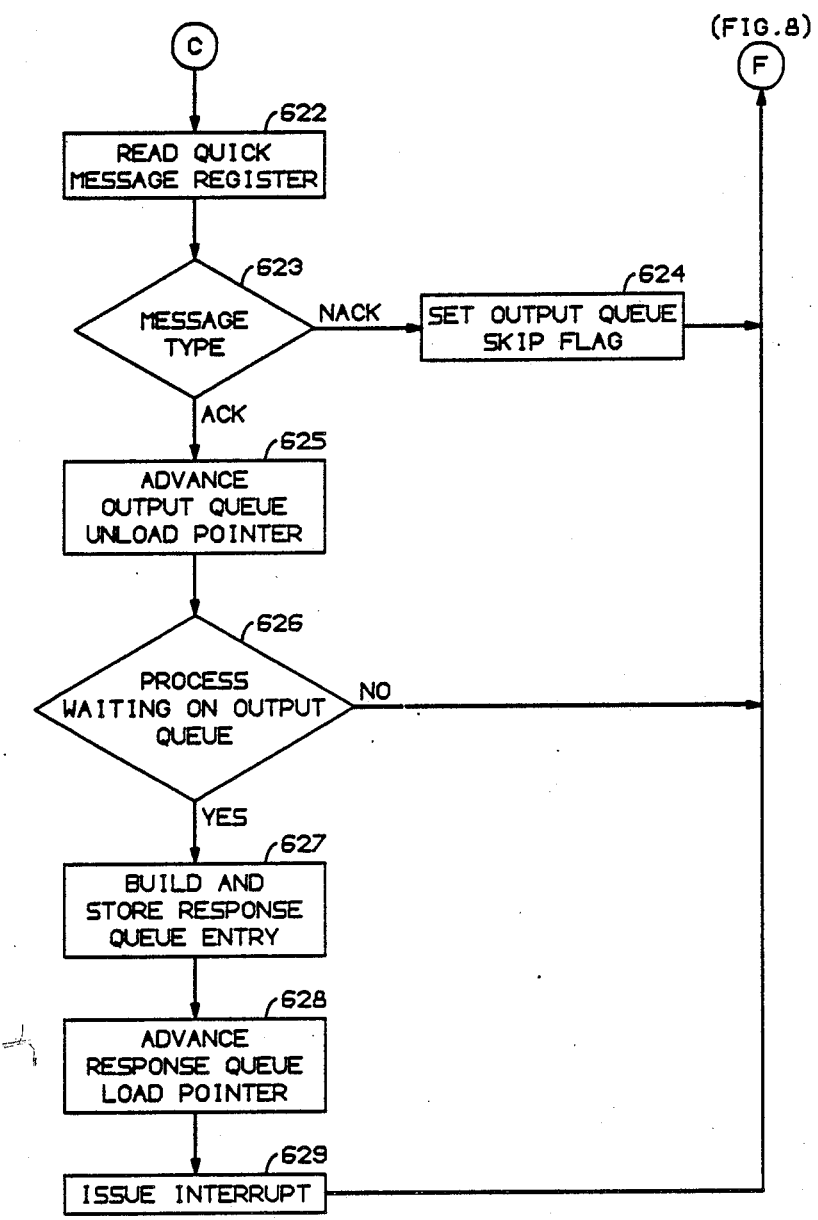

When sending of a packet results in MSBI 146 removing a data entry 317 from output queue 144 on which process waiting flag 313 is set, MSBI 146 issues an interrupt (see steps 626-629 of FIG. 11). The interrupt is received by interface facility 141 and processed in the manner shown in FIG. 24 and discussed below. As part of the processing, the sleeping process is reawakened. Included in awakening and resuming execution of a sleeping process is restoration of the processor state to what it had been at the time the process was put to sleep. This act resumes execution of interface facility 141 at step 408, and facility 141 returns to step 401 to check again for availability of a data entry 317.

When interface facility 141 returns output queue load pointer 315 to calling process 140 at step 409, process 140 fills in BIC control word 323 and user control words 324-327. Field 333 of word 320 and words 322 and 323 of data entry 317 of a user synchronous channel, and field 333 of word 320 of kernel synchronous or a kernel asynchronous channel, will have been filled in at the time output queue 144 was allocated. If it does not wish to use a default buffer pointed to by word 321, process 140 may also change word 321 to point to another buffer. Process 140 stores data that it wishes to send in the buffer pointed to by word 321. Process 140 then calls facility 141 via a WRITEP call, at step 500 of FIG. 7, to request that a packet represented by filled-in data entry 317 be sent. Parameters accompanying the WRITEP call include destination port ID for all types of channels, and destination BIC ID for kernel channels.

In response to the call, facility 141 checks, at step 501, whether destination processor 101 is considered to be active for purposes of interprocessor communications. Facility 141 does so by accessing entry 385 of port structure 380 of sending port 202 to determine whether channel 201 of port 202 specified by the call at step 500 is a user or a kernel channel. If channel 201 is a user channel, facility 141 accesses status indicator 387 of port structure 380 to determine whether port 202 is allocated or connected. If so, the destination is considered to be active.

If channel 201 is a kernel port, facility 141 accesses the array pointed to by entry 386 of port structure 380 to determine whether a destination port 202 is identified therein for destination processor 101. If a destination port 202 is not identified (for example, the value given therefor is null), destination processor 101 is considered to be inactive.

If the destination is determined to be inactive at step 501, facility 141 returns, at step 507, to requesting user process 140 to inform it thereof.

If the destination is considered to be active, facility 141 accesses the next available data entry 317 of output queue 144 of sending port 202, at step 502. Facility 141 accesses output queue pointer 381 of port structure 380 of sending port 202 to determine which output queue 144 corresponds to sending port 202, then accesses load pointer 315 of the identified output queue 144 to find the next available data entry 317, and then accesses that entry 317.

At step 503, facility 141 sets the toggle bit value in field 331 of accessed data entry 317. Facility 141 obtains the proper toggle bit value from entry 383 of port structure 380 of the sending port 202, and then changes the value of that toggle bit in entry 383.

At step 504, facility 141 completes accessed data entry 317. Facility 141 performs address translation functions, for example on word 321. For kernel channel output queue entries 317, facility 141 also stores in word 322 the destination port 202 ID determined at step 501, and stores in word 323 the ID of BIC 110 of destination processor 101 received at step 500. Facility 141 does not set the "quick" message indicating bit of word 323.

Data entry 317 is now complete, and facility 141 advances load pointer 315 of output queue 144, at step 505, to point to the next empty data entry 317. Facility 141 then triggers MSBI 146 to process output queues 144, at step 506, by setting output pending flag 307 of output queue control structure 300. Facility 141 then returns to requesting user process 140 to inform it of completion of the above activities, at step 507.

FIGS. 8-11 flowchart the operation of MSBI 146 in sending a packet to another processor 101, and illustrate use of output queues 144 and response queue 142 of queue structure 145 thereby.

When the system of FIG. 1 is turned on at step 597, MSBI 146 begins to monitor a "receive FIFO not empty" indicator and output pending flag 307 of output queue control structure 300. If it finds that the receive FIFO is not empty, at step 598, MSBI 146 undertakes processing of received packets, at step 600. Received packet processing is flowcharted in FIGS. 18-20 and is discussed later on. If the receive FIFO is empty, MSBI 146 checks whether flag 307 is set, at step 599. If flag 307 is not set, or following received packet processing, MSBI 146 returns to step 598.

In response to finding output pending flag 307 set at step 599, MSBI 146 begins to search for an output queue data entry 317 to send, at step 601. MSBI 146 uses pointers 301 and 302 of structure 300 and next output queue pointers 311 to find an output queue 144 to process. MSBI 146 then checks entry 312 of that output queue 144 to determine whether it should skip over this queue 144. A set skip flag 312 indicates that the input queue of port 202 at the other end of the associated channel 201 is full and therefore not ready to receive a packet. Hence, at step 602, this output queue 144 is considered to have no sendable data entry 317. In that case, MSBI 146 returns to step 601 to look for other output queues 144, as suggested at step 603.

If skip flag 312 is not set, MSBI 146 compares pointers 315 and 316 to determine if they are equal. If so, output queue 144 is empty and so has no data entries 317 to send. Hence, no sendable data entry 317 is found at step 602, and MSBI 146 returns to step 601 to look for other output queues 144, as suggested at step 603. If pointers 315 and 316 are not equal, output queue 144 has at least one sendable data entry 317, at step 602, and MSBI 146 accesses data entry 317 pointed to by unload pointer 316 in order to send the packet represented by that entry to its destination.

After sending a packet, (discussed below), MSBI 146 returns to step 601 to search that output queue 144 for the next data entry 317 to send, and repeats the process until all entries of queue 144 have been sent. MSBI 146 then returns to step 601 to look for other output queues 144, at step 603.

MSBI 146 begins output queue processing with output queue 144 of the kernel synchronous channel. At step 601, MSBI 146 initially accesses entry 301 of output queue control structure 300 to find output queue 144 of the kernel synchronous channel. After it has processed output queue 144 of the kernel synchronous channel, MSBI 146 returns to structure 300 and accesses pointer 302 of output queue control structure 300 to find the first output queue 144 on the linked list of output queues. MSBI 146 then accesses this output queue, and processes it in the manner described above. However, from an output queue 144 on the linked list, MSBI 146 does not return at step 603 to output queue control structure 300, but rather uses pointer 311 of the output queue to find the next output queue 144 on the linked list. MSBI 146 processes each output queue 144 on the linked list in the above described manner.

Next output queue pointer 311 of the last output queue 144 on the linked list has a null entry. When MSBI 146 encounters this null entry 311, at step 603, it is an indication that it has reached the end of the linked list and sent all sendable data entries 317. Its task is completed, and MSBI 146 returns to step 598 to check for a new task.

Sending of packets by MSBI 146, as well as reception of packets by MSBI 146, involves direct communications by MSBI 146 with buffers 147 of BIC 110. Therefore, before discussing steps involved in sending of a packet, it is instructive to digress somewhat and consider buffers 147 and their interface to MSBI 146, illustrated in FIG. 12.

Buffers 147 include a send FIFO 921 for temporarily holding packets being sent to other processors 101, an end-of-packet (EOP) register 917 which is logically an extension of send FIFO 921 and to whose address the last word of a packet is written, a receive FIFO 923 for temporarily holding packets received from other processors 101, a "quick" message register 918 for temporarily holding special acknowledgment packets received from other processors 101, a BIC control register 913 used to specify the destination and type of the packet and other miscellaneous functions not relevant hereto, and a status register 916 comprising a plurality of single-bit indicators used to supply back to MSBI 146 the state of both BIC 110 and the last packet read from or written to the FIFOs or "quick" message register. Status register 916 indicators have the semantic of being cleared by the act of being read.

Figure 12:
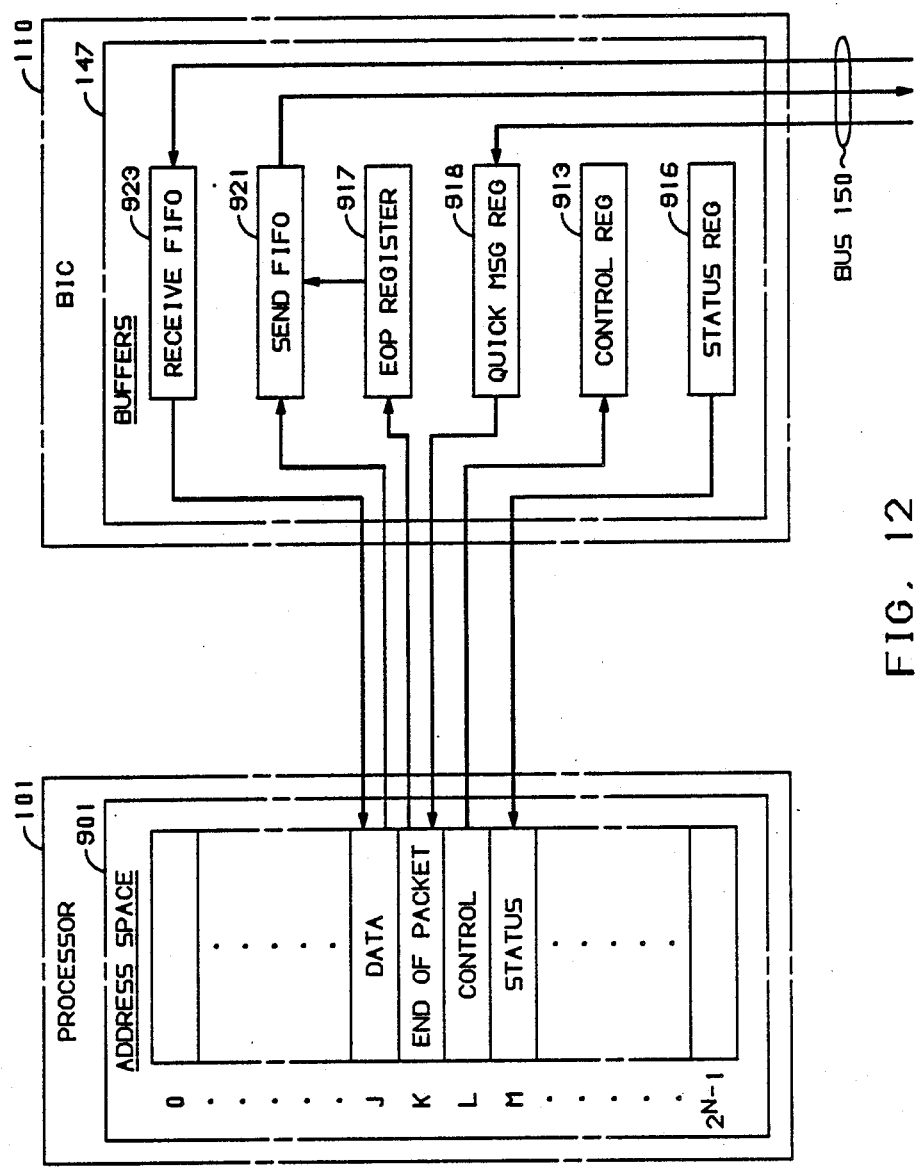
FIG. 12 shows in block diagram form the mapping of the BIC buffers into the address space of a processor of the system of FIG. 1.

The FIFOs and registers are mapped into memory address space 901 of processor 101. As indicated in FIG. 12, writing of address (J) results in writing of send FIFO 921. Reading of address (J) results in reading of receive FIFO 923. Writing of address (K) results in writing of EOP register 917. Reading of address (K) results in reading of "quick" message register 918. Writing of address (L) results in writing of control register 913. And reading of address (M) results in reading of status register 916. The above-mentioned addresses need not be contiguous addresses within the memory spectrum.

Figure 8:
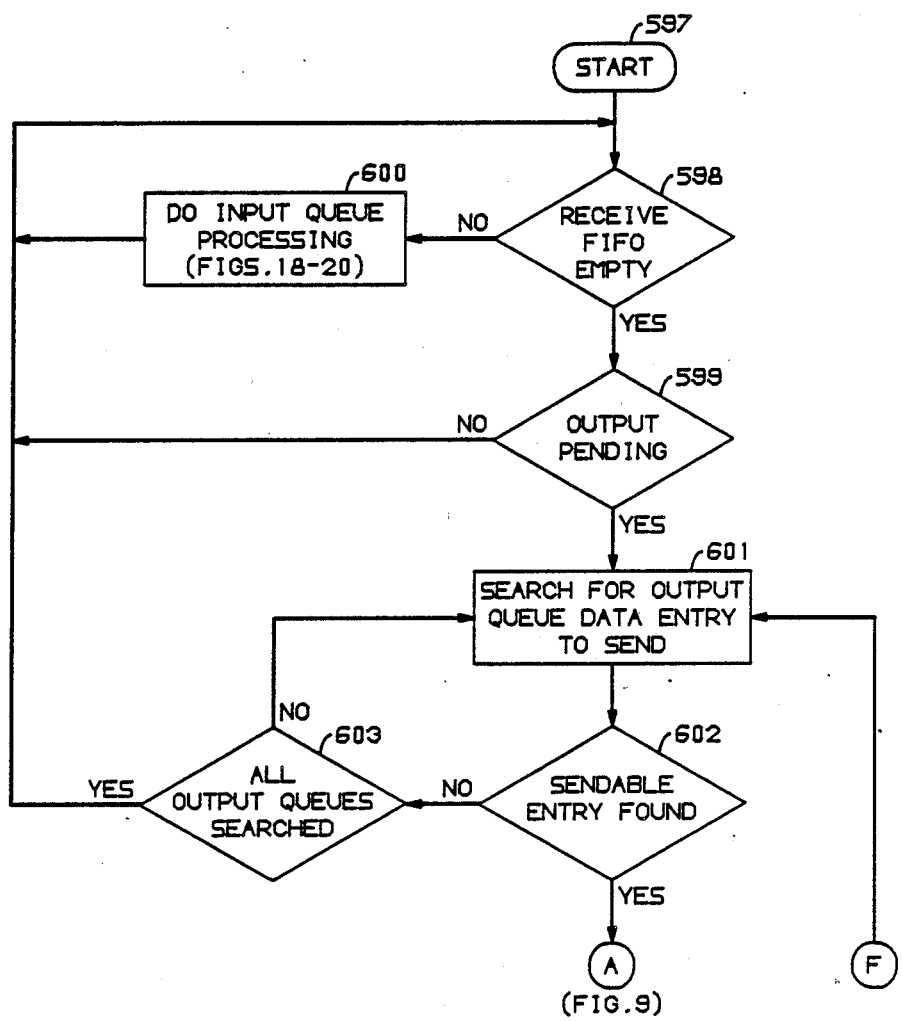
FIGS. 8-11 are a flow diagram of the operation of an MSBI of FIG. 1 in sending a packet.
Figure 9:
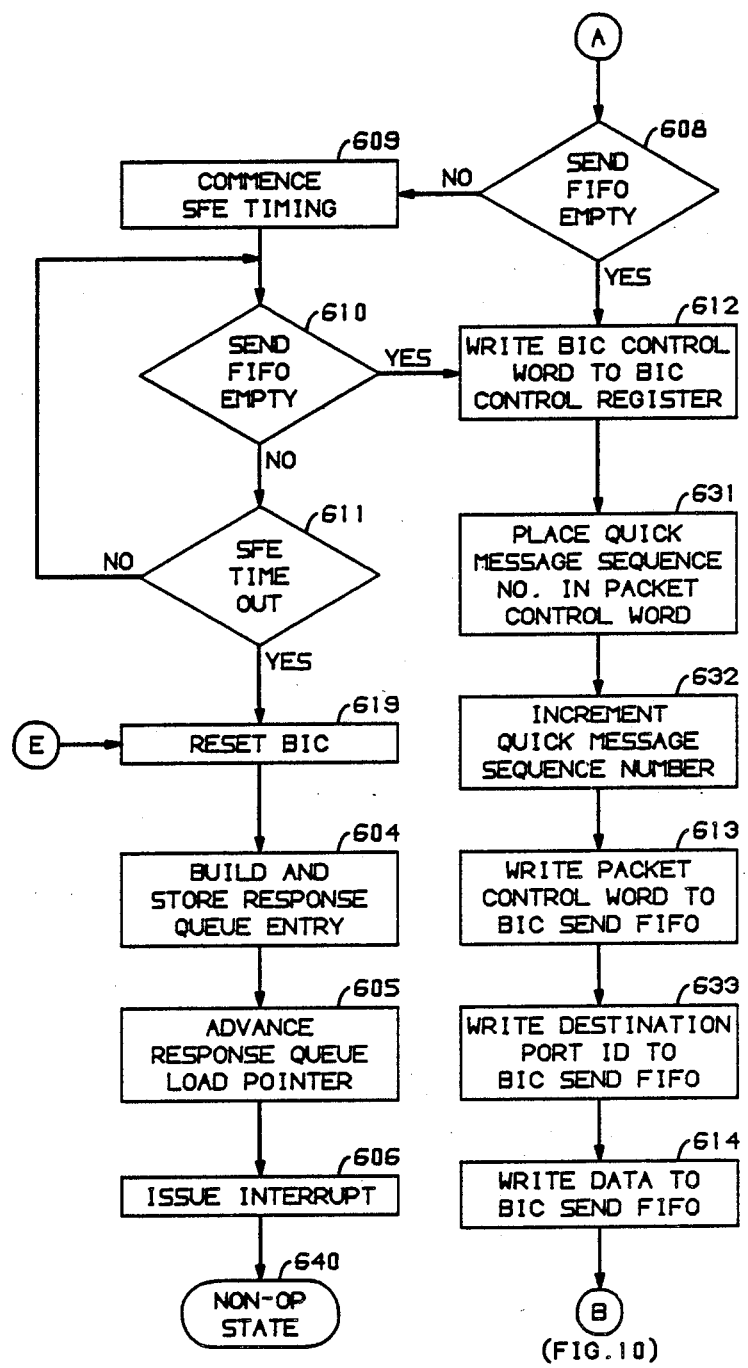

Returning now to step 602 of FIG. 8, upon finding a data entry 317 to send in an output queue 144, MSBI 146 checks, at step 608 of FIG. 9, whether send FIFO 921 of BIC 110 is empty. MSBI 146 makes the determination by reading status register 916 and checking the state of its SFE (send FIFO empty) bit.

If it finds that send FIFO 921 is not empty, MSBI 146 accesses indicator 303 of output queue control structure 300 to obtain the SFE timeout interval duration and begins to time that interval, at step 609. MSBI 146 continues to check the SFE bit of status register 916, at step 610, while timing the SFE timeout interval. If the interval times out before send FIFO 921 becomes empty, it is an indication of a problem with BIC 110. MSBI 146 therefore causes BIC 110 to be reset and initialized, at step 619. MSBI 146 then notifies interface facility 141 of the problem, via response queue 142. At step 604, MSBI accesses in response queue 142 a response entry pointed to by load pointer 360, sets tag field 370 to identify the error condition, and stores in data field 371 an identifier of queue 144 that was affected by the error condition. MSBI 146 then advances load pointer 360 to point to the next free response entry 362, at step 605, and sends an interrupt to facility 141 of processor 101, at step 606. MSBI 146 then goes to a non-operational state, at step 640, wherein it is monitoring task flag 305; when task flag 305 is set by interface facility 141, MSBI 146 performs the task specified by parameters 306. A task may include return to step 598.

Figure 24:
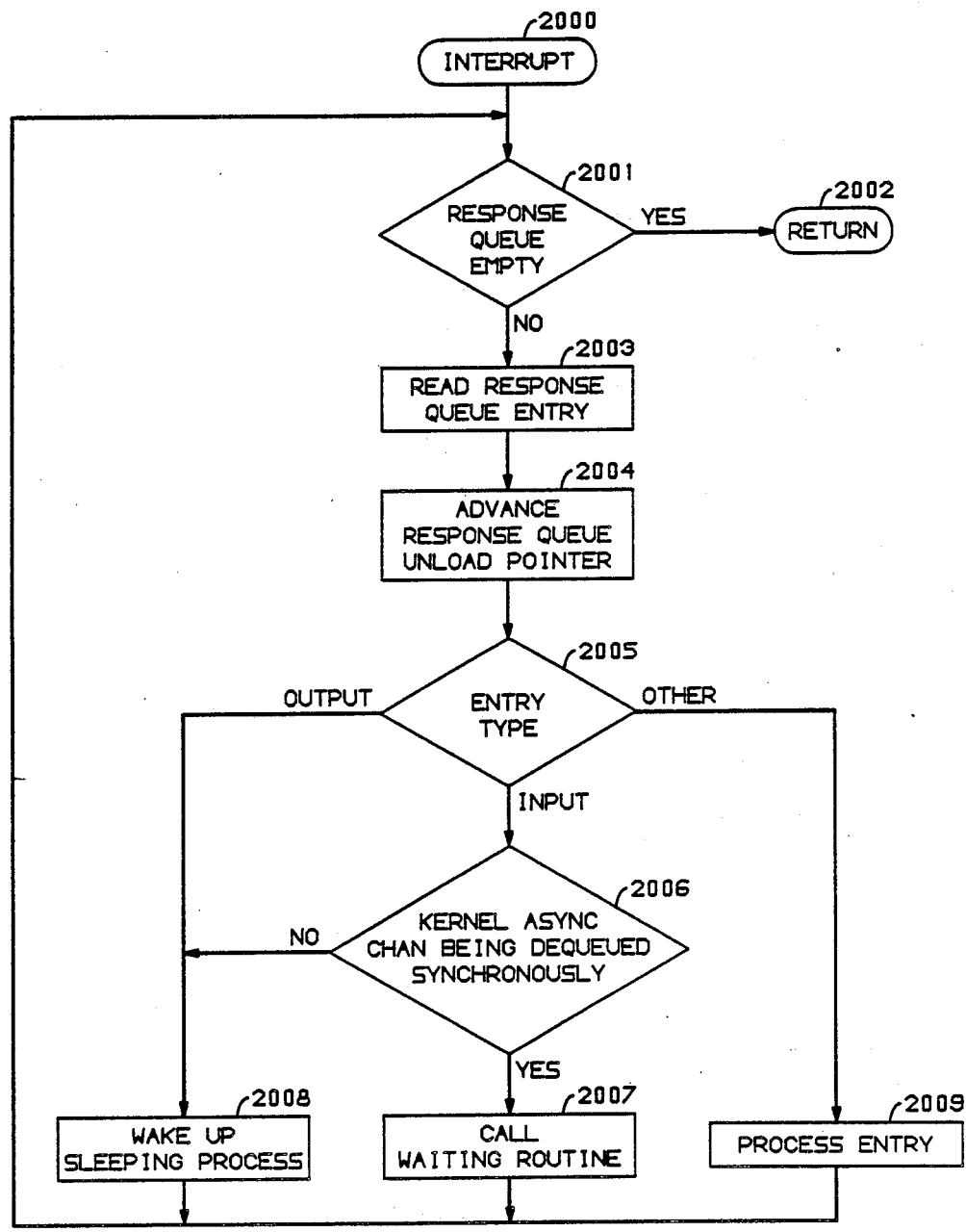
FIG. 24 is a flow diagram of the interrupt processing routine of the interface facility 141 of the system of FIG. 1.

Facility 141 responds to the interrupt as shown in FIG. 24.

If send FIFO 921 is found to be empty at step 608, or becomes empty before the SFE timeout interval times out, at step 610, MSBI 146 accesses BIC control word 323 of data entry 317 that is being sent out, and writes its destination ID and packet type contents to BIC control register 913, at step 612. MSBI 146 then accesses packet control word 320 of data entry 317 that is being sent out, and places a quick message sequence number in field 334 thereof, at step 631. The sequence number is just a sequential count kept by MSBI 146, and is used to associate a return acknowledgment message with the packet. MSBI 146 then increments this count, at step 632. MSBI 146 then writes packet control word 320 to send FIFO 921, at step 613. MSBI 146 also accesses destination port ID 322 of data entry 317 that is being sent out, and writes it to send FIFO 921, at step 633. MSBI 146 then accesses word 321 of data entry 317 that is being sent out to determine the location of the buffer holding the data that the user wishes to have transferred by means of the packet, and performs a DMA transfer of the data to send FIFO 921, at step 614, by writing the data to the memory-mapped address of send FIFO 921.

Figure 10:
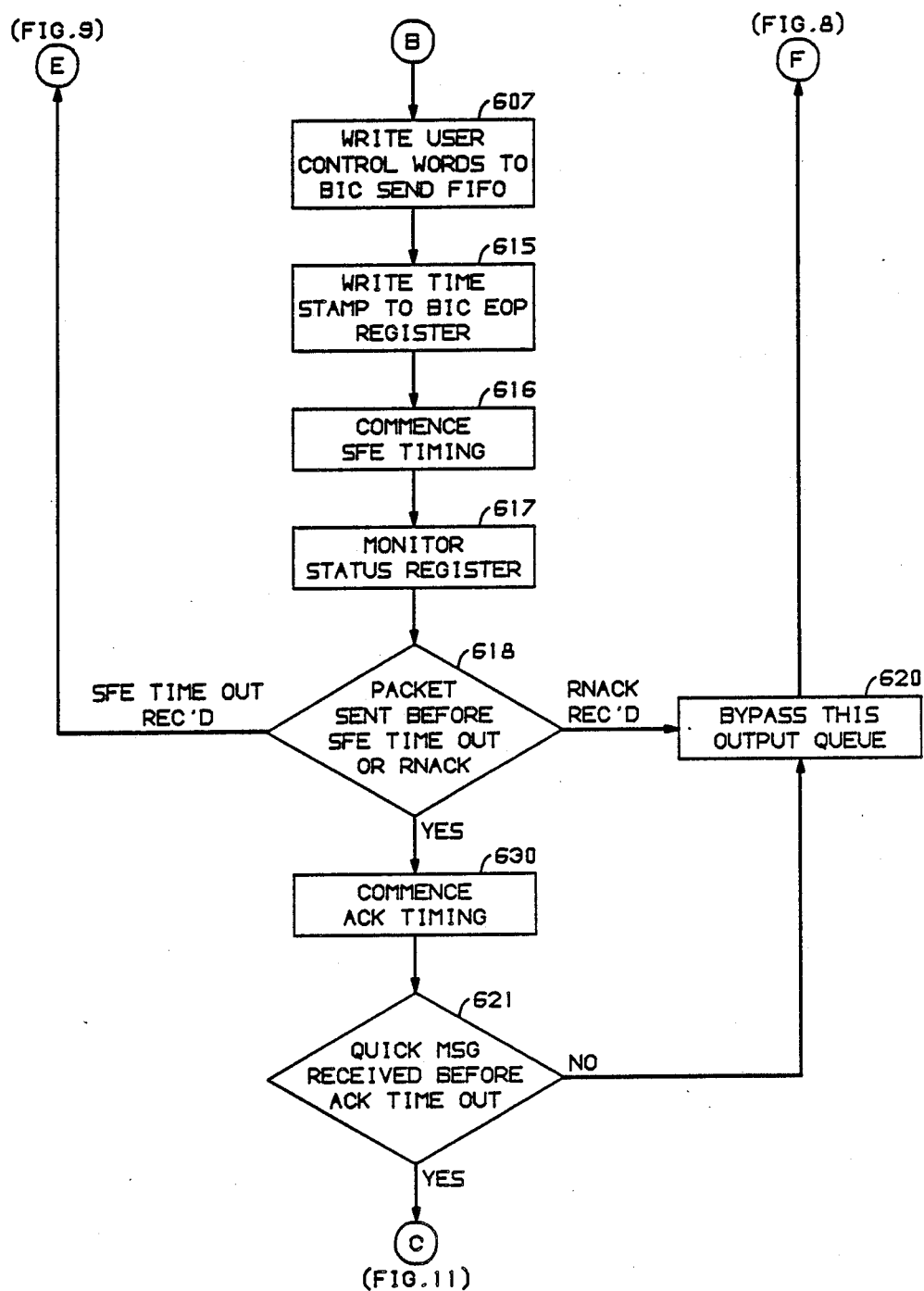

Following completion of the DMA transfer of the data words from the buffer to BIC send FIFO 921, MSBI 146 accesses user control words 324-327 and writes them to send FIFO 921, at step 607 of FIG. 10. MSBI 146 also obtains from processor 101 the present time, as it is known to processor 101, and writes the time to the address of EOP register 917, at step 615, as a time stamp for the packet. Writing of the address of EOP register 917 results in the time stamp being written to send FIFO 921, but signals to BIC 110 that it is in possession of the whole packet and causes it to contend for bus 150 and to transmit the packet to its destination across bus 150.

Figure 13:
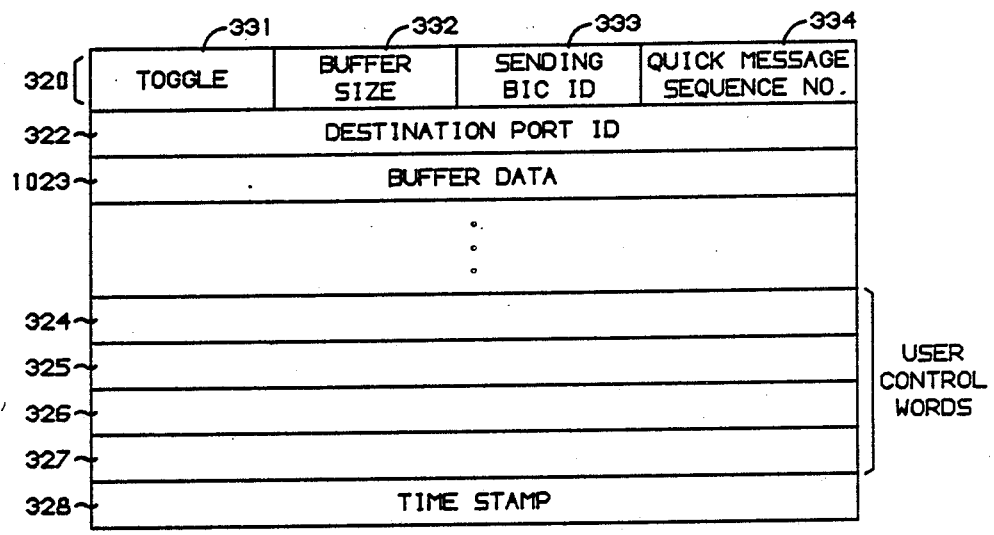
FIG. 13 shows in block diagram form the composition of a regular packet.

The packet that MSBI 146 sent to BIC 110 is shown in FIG. 13. It comprises words 320, 322, and 324-327 of output queue data entry 317, data words 1023 that were transferred by DMA transfer from a buffer in memory of processor 101, and a word 328 carrying the time stamp.

Returning to FIG. 10, when it writes EOP register 917, MSBI 146 commences timing the SFE timeout period specified by indicator 303 of output queue control structure 300, at step 616. MSBI 146 then monitors—repeatedly checks—status register 916, at step 617, reading SFE bit and RNACK bit thereof, as suggested at step 618.

If the SFE timeout period expires before the SFE bit indicates that send FIFO 921 is empty (as a consequence of the whole packet having been sent), at step 618, it is an indication of a hardware problem at link layer 10. MSBI 146 therefore sends a reset signal to BIC 110, at step 619 of FIG. 9, to cause it to be reset and initialized, and then proceeds to step 604 to build a response queue 142 entry to notify facility 141.

If, at step 618 of FIG. 10, the RNACK bit of status register 916 indicates receipt of an RNACK (a negative acknowledgment) signal from BIC 110 of destination processor 101 before sending of the packet is completed, it is an indication that BIC 110 of destination processor 101 failed to receive the whole packet; for example, because of overflow of the destination's receive FIFO 923. To give BIC 110 of destination processor 101 time to recover, MSBI 146 bypasses output queue 144—ceases processing of data entries 317 of output queue 144—that it is presently processing, at step 620, and returns to step 601 of FIG. 8 to look for data entries 317 of other output queues 144 to send.

If, at step 618 of FIG. 10, MSBI 146 detects that the whole packet has been sent before the SFE timeout period timed out or an RNACK signal was received, it is an indication of successful transfer of the packet to BIC 110 of destination processor 101. MSBI 146 commences timing the ACK timeout period specified by indicator 304 of structure 300, at step 630. MSBI 146 then monitors status register 916, checking QMNE ("quick" message register not empty) bit thereof, as suggested at step 621. If the ACK timeout period expires before the QMNE bit indicates receipt of a "quick" message from MSBI 146 of destination processor 101, it is an indication of unsuccessful receipt of the sent packet by MSBI 146 of destination processor 101. To give destination MSBI 146 time to recover, sending MSBI 146 ceases processing of data entries 317 of output queue 144 that it is presently processing, at step 620, and returns to step 601 of FIG. 8 to look for data entries 317 of other output queues 144 to send.

If, at step 621 of FIG. 10, MSBI 146 detects receipt of a "quick" message from the destination's MSBI 146 within the prescribed period, MSBI 146 reads "quick" message register 918 of BIC 110, at step 622 of FIG. 11, to obtain the "quick" message.

Figure 14:
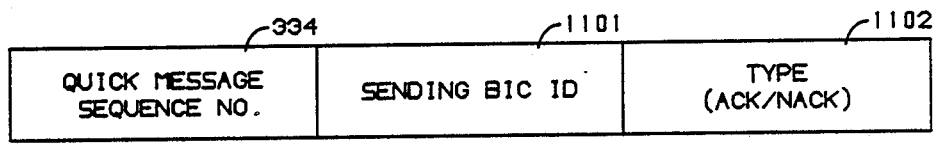
FIG. 14 shows in block diagram form the composition of a "quick" message packet.
Figure 25:
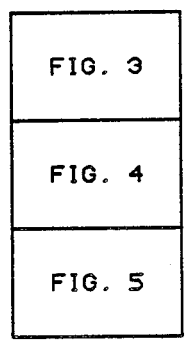
FIG. 25 is a composite showing the arrangement of FIGS. 3-5 to form a single diagram.

A "quick" message is diagramed in FIG. 14. It is a single-word packet comprising quick message sequence number field 334 of the packet being acknowledged by this quick message, sending BIC ID field 1101 which identifies the source of the message, and type field 1102 which indicates whether the message is a positive acknowledgment (ACK) or a negative acknowledgment (NACK) of the packet being acknowledged.

Having read the "quick" message, at step 622 of FIG. 11, MSBI 146 examines type field 1102 of the received "quick" message to determine the message type, at step 623. If the "quick" message is a NACK (negative acknowledgment), it indicates that the packet was not received by destination MSBI 146 because an input queue 143 overflow occurred. To allow time for the problem-causing condition to be cured at destination processor 101, sending MSBI 146 sets skip flag 312 of output queue 144 that it is presently processing, at step 624. While entry 312 is set, MSBI 146 will not attempt to process and send out any data entries 317 of that output queue 144. MSBI 146 then returns to step 601 of FIG. 8 to look for data entries 317 of other output queues 144 to send.

If the "quick" message examined at step 623 of FIG. 11 is an ACK (acknowledgment), it indicates successful receipt of the packet by destination processor 101. MSBI 146 therefore accesses unload pointer 316 of the output queue 144 and advances the unload pointer, at step 625, thereby effectively discarding the sent entry 317 from output queue 144. MSBI 146 then checks flag 313 to determine whether any process 140 is waiting on this output queue 144, at step 626. If not, MSBI returns to step 601 of FIG. 8 to look for other output queue data entries 317 to send.

If a process 140 is waiting on this output queue 144, MSBI 146 notifies facility 141 of the successful transfer of a packet. At step 627 of FIG. 11, MSBI 146 accesses in response queue 142 a response entry 362 pointed to by load pointer 360, sets tag field 370 to identify an output queue response, and stores the address of the output queue's header 340 in data field 371. MSBI 146 then advances pointer 360 to point to the next free response entry 362, at step 628, and sends an interrupt to facility 141 of processor 101, at step 629. MSBI 146 then returns to step 601 of FIG. 8 to search for another output queue data entry 317 to send.

Facility 141 responds to receipt of the interrupt in the manner shown in FIG. 24.

LINK LAYER

Figure 15:
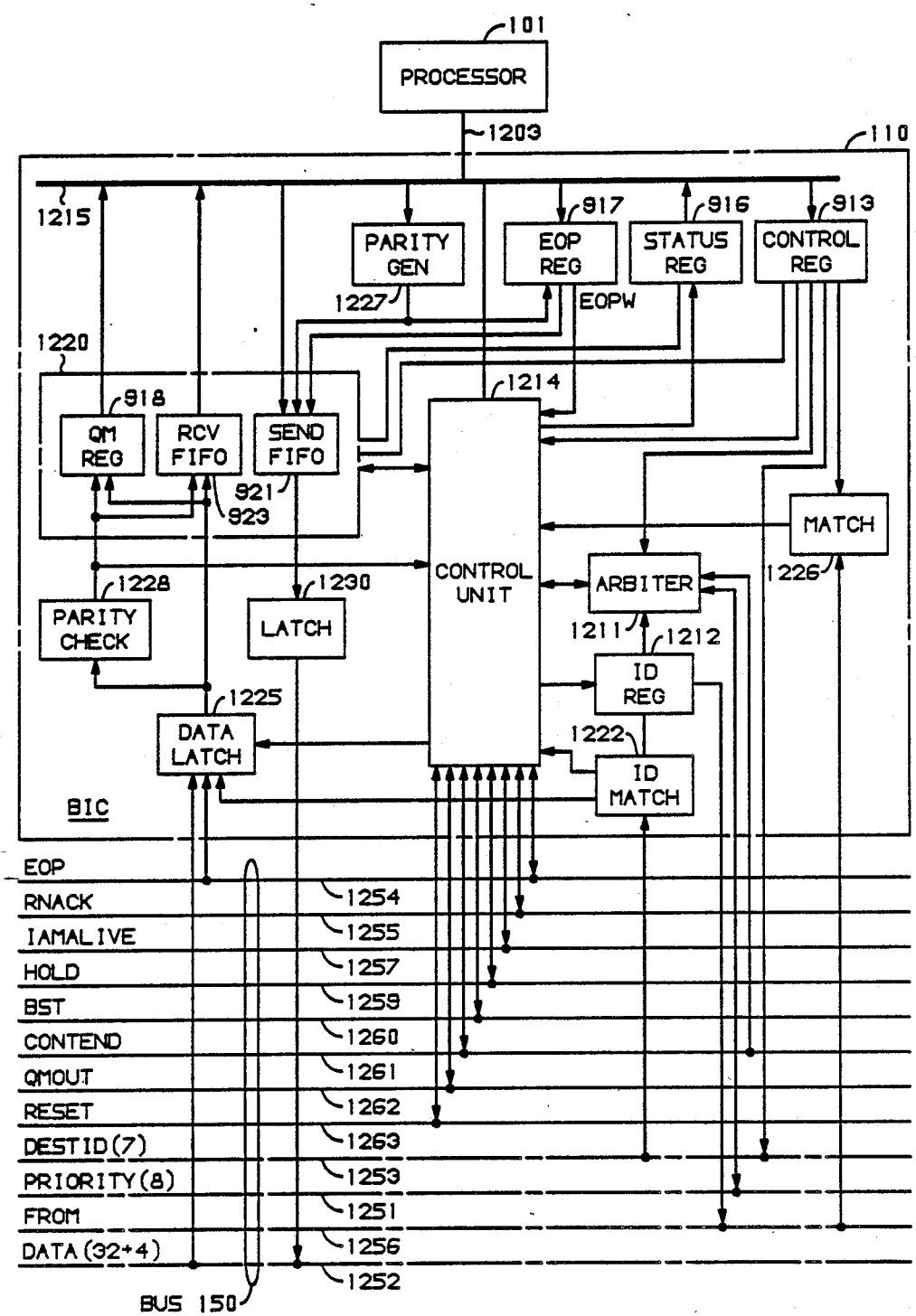
FIG. 15 is a block diagram of a BIC and the bus of the system of FIG. 1.

BIC 110 and bus 150 of FIG. 1 are illustrated in FIG. 15. BIC 110 comprises a data buffer unit 1220 which consists of receive FIFO 923, send FIFO 921, and "quick" message register 918. BIC 110 also comprises control unit 1214, control register 913, status register 916, and end-of-packet (EOP) register 917. These units are involved in communications between processor 101 and BIC 110, and between processors 101. Receive FIFO 923 is the repository of incoming packets, while send FIFO 921 is the repository of outgoing packets. "Quick" message register 918 is the repository for a received "quick" message—a single-word high-priority packet. Control register 913 is used to specify the identification of the destination of the packet that is to be sent, and also provides a means for processor 101 to exert control over the activities of BIC 110. Status register 916 is used to supply back to processor 101 the state of BIC 110 and information about the last packet read from, or written to, FIFOS 921 and 923. And EOP register 917 is used to cause BIC 110 to begin contending for access to bus 150. EOP register 917 is functionally an extension of send FIFO 921; data written to the address of EOP register 917 is actually written into FIFO 921, and EOP register 917 generates an additional, end of packet, bit which it sends to send FIFO 921 to accompany the last packet word.

Processor 101 has write access to send FIFO 921, control register 913, and EOP register 917, and has read access to status register 916, receive FIFO 923, and "quick" message register 918. Illustratively, these units are mapped into the address space of processor 101 (see FIG. 12) and are addressed via its memory address bus. In that event, processor bus 1203 is simply an extension of the memory bus of processor 101. Alternative bus arrangements, for example, ones using the processor's peripheral bus, can be readily devised as well.

Control unit 1214 receives a read or write strobe from processor 101 via bus 1215 when one of the units 913–918, 921, and 923 is addressed by processor 101. Control unit 1214 examines two preselected bits of the address and the specified operation—a read or a write—to select one of these four addressable units, and controls access from processor 101 to the addressed unit in a standard well-known fashion. Finite state machines or similar logic may be used to implement separate controls of the read and write access to the FIFOs and registers of buffers 147. The circuitry and logic for accomplishing these operations are well known in the art and are not described in detail herein.

Control unit 1214 comprises the necessary decoders to decode address information, and Field Programmable Logic Arrays (FPLAs) and Field Programmable Logic Sequencers (FPLSs) to implement finite state machines. All of these devices are commercially available and their use to accomplish the desired functions are well known.

Processor 101 loads send FIFO 921 with a packet one word at a time, by performing repeated writes to the memory-mapped FIFO address. Only a single packet may reside in FIFO 921 at any one time. Illustratively, when processor 101 writes words of a packet to send FIFO 921, a parity generator 1227 automatically computes a parity code for each data word and stores the parity code in FIFO 921 along with the word.

FIFO 921 is a standard commercially available FIFO which provides the customary "buffer empty" indication, which is monitored by control unit 1214. The first word stored in FIFO 921 negates the "buffer empty" indication and causes control unit 1214 to clear the SFE bit of status register 916.

Processor 101 writes the last or only word of the packet to the address of EOP register 917 to indicate end of packet. Parity generator 1227 computes the parity code for this word as well, and sends it to send FIFO 921.

Along with the data words of a packet which it transmits to send FIFO 921, processor 101 also transmits BIC control word 323 to control register 913. BIC control word comprises a 7-bit destination identity code (DID) and a 1-bit packet-type code. The destination code is the identity or address of BIC 110 of destination processor 101 to which the packet is to be transmitted. The packet-type code indicates whether the packet is a regular packet or a "quick" message.

Data words in this illustrative system consist of 32 bits and each is accompanied by four parity bits generated by parity generator 1227. Send FIFO 921 is 37 bits wide, to accommodate the above-mentioned 36 bits plus the end-of-packet bit generated by EOP register 917. Upon being written, EOP register 917 also generates an EOPW output signal that indicates to control unit 1214 that the last word of a packet has been received. EOPW signal causes control unit 1214 to initiate contention for interconnecting bus 150.

Interconnecting bus 150 is a parallel bus that comprises a multiple-bit PRIORITY bus 1251 to which an arbiter circuit 1211 is connected. Bus arbitration may be accomplished by any of a number of well-known bus arbitration schemes which grant bus access on a priority basis. One well-known bus arrangement is the standard S-100 bus for which an arbitration protocol has been defined. Arbiter circuit 1211 may be a well-known arbiter circuit such as that defined for the S-100 bus, or a similar circuit which selects from a number of contenders and provides a grant signal to the highest priority contender. In this illustrative system, arbiters 1211 are arranged to provide "fair" access to bus 150 in such a manner that all arbiters 1211 contending for bus 150 in any one bus cycle are served before arbiters 1211 activated in subsequent bus cycles are allowed to seize bus 150. An arrangement for implementing such a bus allocation scheme is disclosed in U.S. Pat. Nos. 4,514,728 and 4,384,323, entitled "Store Group Bus Allocation System". Using the so-called "fair access" scheme, a group of BICs 110 in contention for bus 150 assert BST lead 1260 of bus 150. Contention may last several bus cycles and other BICs 110 do not attempt to contend for bus 150 as long as BST lead 1260 is asserted. When a BIC 110 is in the contention process, it asserts CONTEND lead 1261; when a BIC 110 seizes bus 150, it releases lead 1261 and asserts HOLD lead 1259 and holds it asserted during the packet transfer interval.

Priority bus 1251 is a 8-bit bus having eight priority leads. Such an arrangement can theoretically be used to define as many as 255 different priorities using the S-100 arbiter circuit. Arbiter 1211 is connected to all eight leads of PRIORITY bus 1251. Arbiter 1211 receives a unique seven bit identification word from I.D. register 1212. This identification word defines the identity of processor 101 and BIC 110, which also serves as the priority of processor 101 for purposes of bus 150 access. Arbiter 1211 also receives from control register 913 a single-bit indication of whether the packet to be sent is a normal data packet or a high-priority "quick" message. Arbiter 1211, through the use of open collector logic gates or the like, holds certain of the seven least significant priority leads of PRIORITY bus 1251 asserted so as to define the priority of associated processor 101. Arbiter 1211 holds the most significant eighth lead of PRIORITY bus 1251 asserted only if the received single-bit indication identifies the packet as a "quick" message. By virtue of the value of this most significant lead of bus 1251, processors 101 having a "quick" message to send have a higher priority than processors 101 that have only a regular packet to send. Only if there is no processor 101 of a higher priority defined by the state of the eight priority leads does arbiter 1211 provide a WON signal to control unit 1214, thereby granting it access to the remainder of bus 150.

Figure 16:
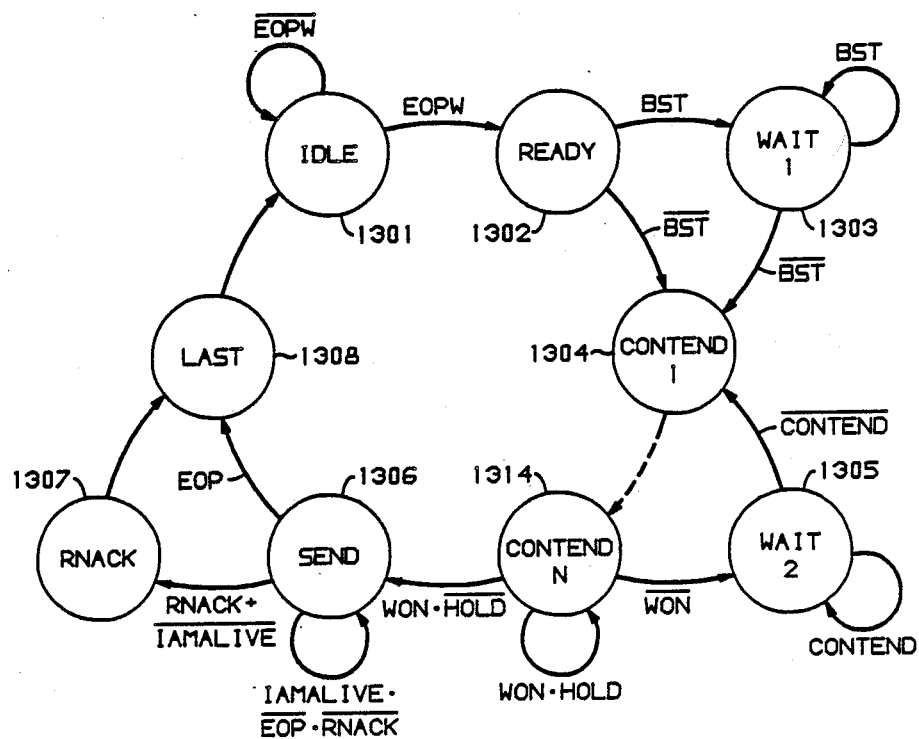
FIG. 16 is a state diagram of a send finite state machine of the control unit of the BIC of FIG. 15.

Control unit 1214 of each BIC 110 comprises a finite state machine to control the reading or receiving of data from DATA bus 1252, and a finite state machine to control the writing or sending of data to DATA bus 1252. The bus send finite state machine is depicted in FIG. 16. The sequence shown in FIG. 16 is used to transfer data from send FIFO 921 to bus 1252.

Upon the generation of the EOPW signal by EOP register 917, the finite state machine moves from IDLE state 1301 to READY state 1302. This last-named state is used as a synchronization state, because the EOPW signal is not synchronized with the bus 150. If BST lead 1260 is asserted, indicating that one or more other arbiters are contending for bus 150, a transition is made from READY state 1302 to WAIT-1 state 1303. If BST lead 1260 is not asserted when the finite state machine is in READY state 1302 or in WAIT-1 state 1303, a transition is made to CONTEND-1 state 1304.

Arbiters 1211 connected to bus 150 determine priority by applying their identity to PRIORITY bus 1251 and by withdrawing when the I.D. of a higher priority arbiter is on PRIORITY bus 1251. In such an arrangement, depending upon the electrical delays of the physical circuitry, it may take more than one bus cycle—possibly three to five bus cycles—to resolve the contention for bus 150. In FIG. 16, this is represented by a dotted line between CONTEND-1 state 1304 and the CONTEND-N state 1314. The actual number of CONTEND states is a matter of design choice dependent on the physical parameters of the system. In any event, if arbiter 1211 has not transmitted a WON signal to control unit 1214 to indicate that access has been granted by the time normally required for resolving contention for bus 150, a transition is made to WAIT-2 state 1305. In state 1305, control unit 1214 monitors CONTEND lead 1261 of bus 150, and when this lead is no longer asserted, a transition is made from WAIT-2 state 1305 to CONTEND-1 state 1304. The sequencing through the CONTEND states and WAIT-2 state 1305 is repeated until arbiter 1211 provides a WON signal to control unit 1214.

Control unit 1214 also monitors HOLD lead 1259 of bus 150. This lead is asserted by a BIC 110 which has obtained access to bus 150 and is sending data. As long as HOLD lead 1259 remains asserted after control unit 1214 has received the WON signal, the bus send finite state machine remains in CONTEND-N state 1314. When HOLD lead 1259 is relinquished, a transition is made to SEND state 1306. In this state, control unit 1214 asserts HOLD lead 1259 of bus 150 to indicate its seizure of the bus.

Control unit 1214 transfers data words from send FIFO 921 and other information to DATA bus 1252 while in SEND state 1306. A well-known data latch 1230 is provided between send FIFO 921 and DATA bus 1252 to compensate for timing differences between FIFO 921 and bus 1252. In SEND state 1306, latch 1230 is enabled by control unit 1214 to allow transfers of data from FIFO 921 to bus 1252.

Packet words obtained from send FIFO 921 are transmitted on the 32-bit DATA bus 1252, one at a time. Each word on bus 1252 is accompanied by destination address (DID) obtained from control register 913 and transmitted on the 7-bit DEST I.D. bus 1253, and origination address obtained from I.D. register 1212 and transmitted on the 7-bit FROM bus 1256, all of which are part of bus 150. A bit code specifying the message type—regular or "quick" message—and possible side effects of the message, such as destination BIC reset, are transmitted on control lines QMOUT 1262 and RESET 1263, one bit per line, which lines are also part of bus 150.

While it is in SEND state 1306, control unit 1214 monitors RNACK lead 1255 and IAMALIVE lead 1257 of bus 150. BIC 110 of destination processor 101 uses IAMALIVE lead 1257 to signal to sending control unit 1214 an acknowledgment of receipt of the transmission, and uses RNACK lead 1255 to signal to sending control unit 1214 a problem with the transmission, such as detection of a parity error or overflow of receive FIFO 923 or of "quick" message register 918. When receiving BIC 110 asserts lead 1255 or fails to assert lead 1257, the bus send finite state machine of sending control unit 1214 changes from SEND state 1306 to RNACK state 1307. In state 1307, the bus send finite state machine halts further transfers of data from send FIFO 921 and other information to bus 150, clears send FIFO 921, and asserts an RNACK bit of status register 916 to inform processor 101 of the problem. Operation of the send finite state machine then continues as if the transmission completed normally, at LAST state 1308.

The last or only word of a packet transmitted on DATA bus 1252 is accompanied by an EOP bit transmitted on EOP lead 1254. When this EOP bit is detected by control unit 1214, a transition is made to LAST state 1308. In LAST state 1308, send FIFO 921 and data latch 1230 are disabled from control unit 1214. From LAST state 1308, a return is made to IDLE state 1301.

Clearing of send FIFO 921 in RNACK state 1307 or transmission from FIFO 921 of the last word in SEND state 1306 raises the "buffer empty" indication, which causes control unit 1214 to set the SFE bit of status register 916.

Reception of a packet by BIC 110 of destination processor 101 across bus 150 is considered next.

An I.D. match circuit 1222 in BIC 100 monitors DEST I.D. bus 1253 and compares its contents with the address defined in I.D. register 1212. When BIC 110 of source processor 101 transmits a packet to destination processor 101 in the manner as just described, ID match circuit 1222 recognizes the address of its own processor 101 and generates a MATCH signal that it sends to control unit 1214 and DATA latch 1225. Data latch 1225 is enabled by the MATCH signal from match circuit 1222 and an ENABLE signal from control unit 1214 to transfer data from DATA bus 1252 to receive FIFO 923, "quick" message register 918, and parity checker 1228.

Parity checker 1228 receives the data words and associated parity bits from latch 1225 and automatically checks the parity. When it detects bad parity, checker 1228 generates a one-bit parity error signal to accompany the word whose parity failed.

Figure 17:
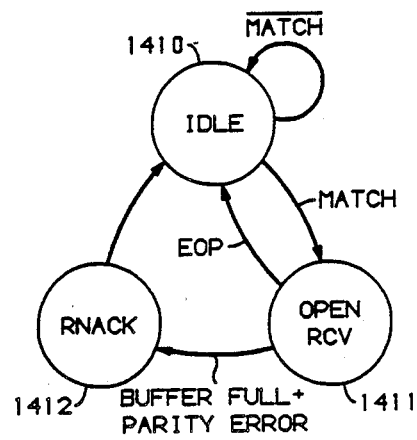
FIG. 17 is a state diagram of a receive finite state machine of the control unit of the BIC of FIG. 15.

FIG. 17 shows the states of the finite state machine for controlling bus 150 receive operation, as embodied in control unit 1214 of each BIC 110 connected to bus 150.

The initial state of the receive finite state machine is IDLE state 1410. In response to receipt of the MATCH signal from circuit 1222, control unit 1214 makes a transition to OPEN RECEIVE state 1411 and immediately begins to generate a signal on IAMALIVE lead 1257. Also in this state, an ENABLE signal is provided to data latch 1225, and data transfer from bus 1252 to receive FIFO 923 or "quick" message register 918 takes place. Control unit 1214 examines QMOUT lead 1262 of bus 150. If a "quick" message is indicated, control unit 1214 issues an ENABLE signal to "quick" message register 918. If a "quick" message is not indicated, control unit 1214 issues an ENABLE signal to receive FIFO 923. As long as the address on I.D. bus 1253 matches contents of I.D. register 1212, under conditions other than buffer overflow, there is no need to change from OPEN RECEIVE state 1411.

The one of the "quick" message register 918 and receive FIFO 923 that receives the ENABLE signal from control unit 1214 is enabled thereby to store the received data. Receive FIFO 923 is a standard commercially-available FIFO which provides the customary "buffer full" and "buffer empty" indications. Register 918 likewise provides "buffer full" and "buffer empty" indications, but does so via a single indicator; since register 918 is only one word deep, when it is not empty it is full, and vice versa. The first word stored in receive FIFO 923 negates its "buffer empty" indication, which causes control unit 1214 to set a RFNE bit in status register 916. A word stored in register 918 negates its "buffer empty" indication, which causes control unit 1214 to set a QMNE bit in status register 916.

Receive FIFO 923 and "quick" message register 918 are 39 bits wide. 32 bits hold the received data word and four bits hold the accompanying parity bits. One bit holds the parity error signal, if any, generated by parity checker 1228. One bit holds a "buffer overflow" error signal, if any, generated by control unit 1214. The last, or only, received word of the packet is accompanied by a one-bit EOP signal on EOP lead 1254 of bus 150, which bit is stored in the 39th bit with the accompanying packet word.

A "buffer full" condition of receive FIFO 923 before receipt of an end-of-packet (EOP) signal is interpreted as an overflow condition. Similarly, a "buffer not empty" condition of "quick" message register 918 during receipt of the single-word "quick" message is interpreted as an overflow condition. In normal operation, processor 101 reads data words from receive FIFO 923 or "quick" message register 918 at a slower rate than the transfer rate of data bus 1252, thus accounting for a possible buffer overflow condition even in the absence of abnormal condition in destination processor 101. In the drawing, the leads which provide buffer status signals to the control unit 1214 are, for the sake of simplicity, shown as an output from the buffer unit 1220.

In OPEN RECEIVE state 1411, control unit 1214 monitors the "buffer full" indication of receive FIFO 923, "buffer empty" indication of register 918, and EOP lead 1254 of bus 150. The occurrence of a "buffer full" indication before the EOP signal for an associated packet has been received on EOP lead 1254 indicates that nothing, or only part of a packet, has been successfully stored in receive FIFO 923. Similarly, receipt of a "quick" message while register 918 is not empty indicates register 918 overflow. Either condition causes the receive finite state machine to make a transition to RNACK state 1412.

Also in OPEN RECEIVE state 1411, control unit 1214 monitors output of parity checker 1228. When checker 1228 detects bad parity on a received word and generates indication thereof, it is detected by control unit 1214 and causes the receive finite state machine to make a transition to RNACK state 1412.

In RNACK state 1412, control unit 1214 deasserts IAMALIVE lead 1257 and asserts RNACK lead 1255. Control unit 1214 also removes the ENABLE signal from DATA latch 1225 to block further writes to receive FIFO 923 or register 918. In the case of buffer overflow, control unit 1214 sets a buffer overflow bit accompanying the last-stored received word in receive FIFO 923 or register 918. Control unit 1214 also generates an EOP bit to accompany the last-stored received word. Finally, control unit 1214 removes ENABLE signal from the one of receive FIFO 121 and register 118 that was receiving the packet.

Following the above-described activities in RNACK state 1412, or upon detecting an EOP signal on EOP lead 1254 without detecting either buffer overflow error or a parity error in OPEN RECEIVE state 1411, receive finite state machine makes a transition back to IDLE state 1410, removing ENABLE signals from DATA latch 1225, receive FIFO 923, and "quick" message register 918 in the process.

Detection of RFNE bit being set in status register 916 eventually causes MSBI 146 to read data from receive FIFO 923, one word at a time, illustratively by performing repeated reads of the memory-mapped FIFO address. When the last word of the packet is read, control unit 1214 inhibits further reading of receive FIFO 923 until such time as processor 101 specifies by command that it wants to read the next packet. Processor 101 continues to read packets out of FIFO 923 until FIFO 923 is empty. This condition raises the "buffer empty" indication, which causes control unit 1214 to reset the RFNE bit in status register 916.

Similarly, detection of QMNE bit being set in status register 916 eventually causes MSBI 146 to read the "quick" message from register 918, thus emptying register 918. This condition raises the "buffer empty," indication, which causes control unit 1214 to reset the QMNE bit in status register 916.

PACKET LAYER (CONTINUED)

Figure 18:
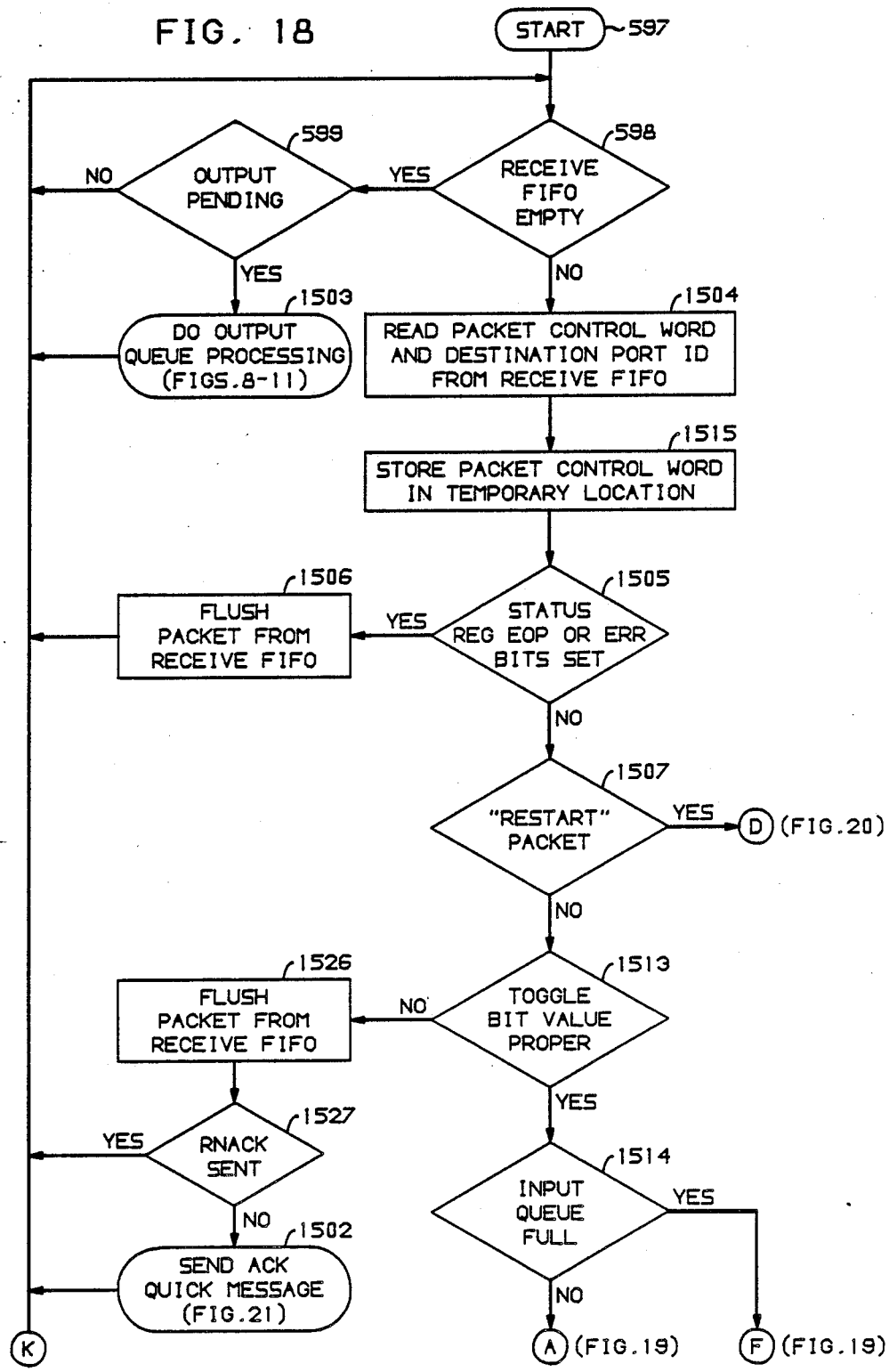
FIGS. 18-20 are a flow diagram of the operation of an MSBI of the system of FIG. 1 in receiving a packet.
Figure 19:
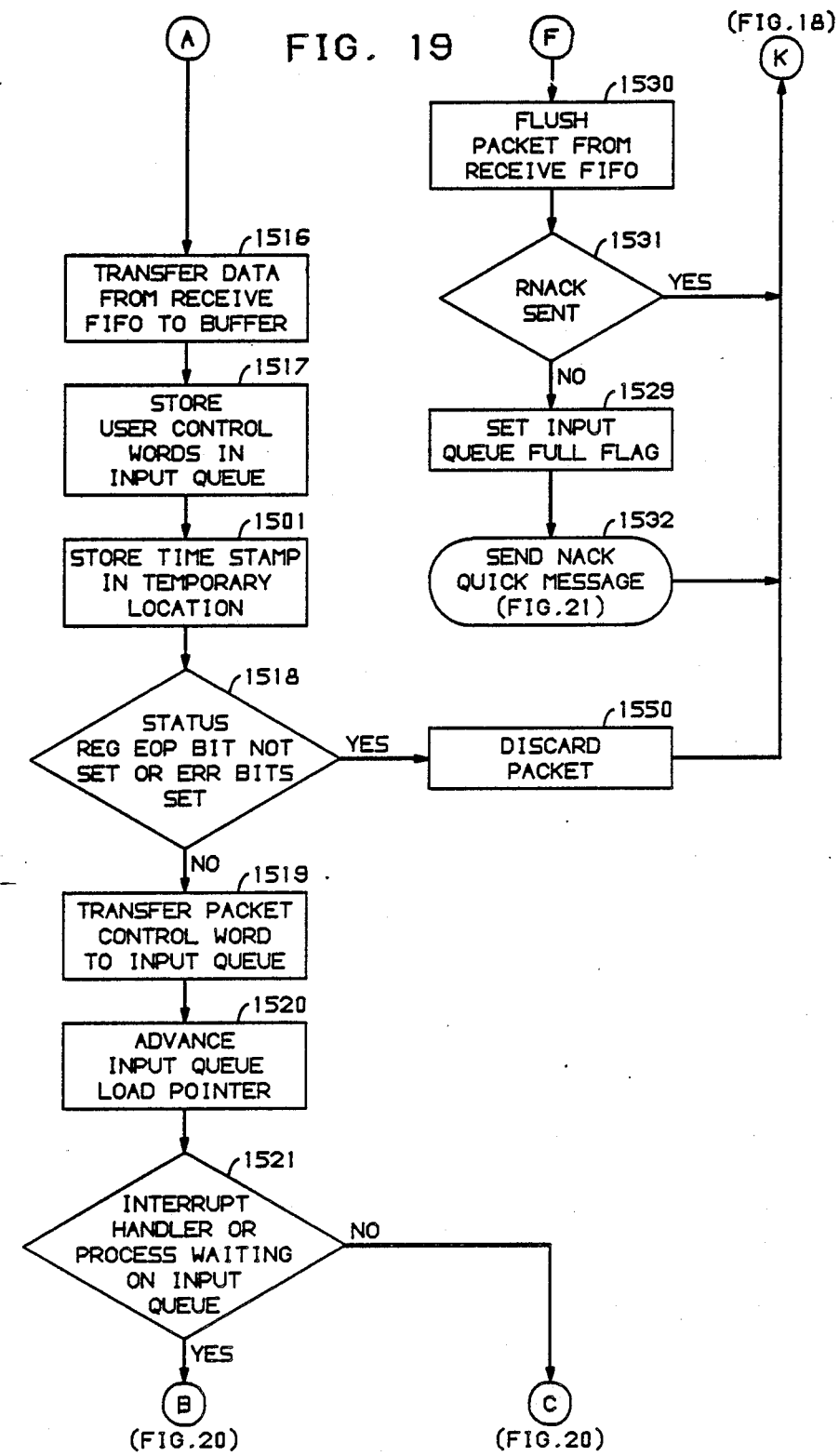
Figure 20:
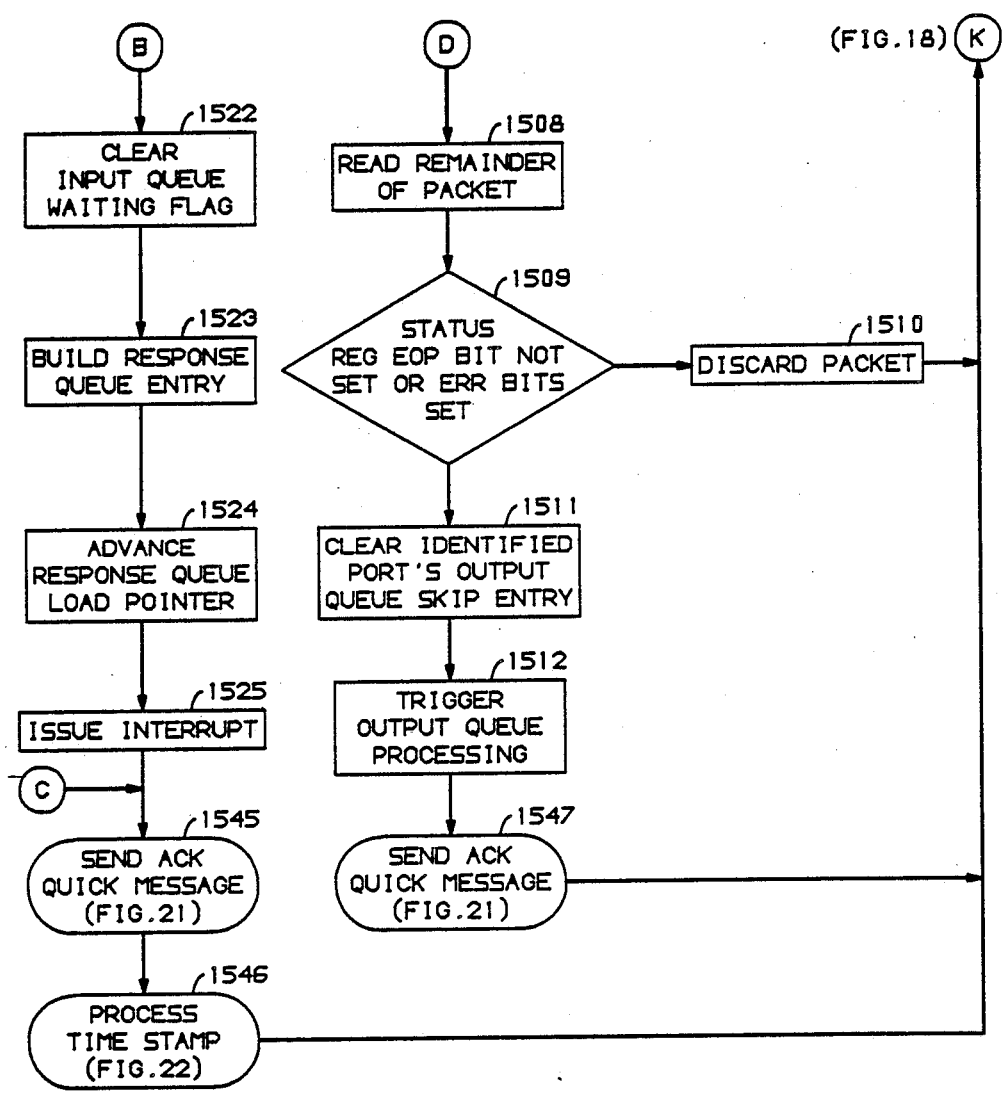

FIGS. 18–20 flowchart operation of MSBI 146 in receiving a packet through BIC 110 from a source processor 101, and illustrate use of input queues 143 and response queue 142 of structure 145.

When the system of FIG. 1 is turned on at step 597, MSBI 146 begins to monitor RNFE (receive FIFO 923 not empty) bit of BIC status register 916 and output pending flag 307 of output queue control structure 300. MSBI 146 checks whether the RFNE bit is set, at step 598. While the RFNE bit is not set, it indicates that receive FIFO 923 is empty, and MSBI 146 checks flag 307, at step 599. If it finds flag 307 set, at step 599, MSBI 146 processes output queues 144, at step 1503, and then returns to step 598. Output queue processing is flowcharted in FIGS. 8–11 and was discussed above.

When the RFNE bit indicates at step 598 that receive FIFO 923 is not empty, it means that one or more packets have been, or are being, received by BIC 110. MSBI 146 therefore commences to read a received packet out of receive FIFO 923, at step 1504, by performing repeated reads of the memory address to which receive FIFO 923 correspond.

The first read operations performed on receive FIFO 923, at step 1504, result in MSBI 146 obtaining packet control word 320 and DEST PORTID word 322, (see FIG. 13), and MSBI 146 stores word 320 in a temporary storage location, at step 1515. If either of the read words was accompanied by an EOP (end of packet) bit indicating that it was the last received word of a packet, a bit indicating that a receive FIFO 923 overflow condition occurred during receipt of the packet, or a bit indicating that a parity error was detected on that word, reading of these words results in the EOP bit, the SFERR bit, or the SPERR bit, respectively, of status register 916 becoming set. Since these two words alone cannot form a packet, setting of the EOP also indicates error in packet reception. MSBI 146 therefore reads status register 116 and checks the EOP bit, the SFERR bit, and the SPERR bit, at step 1505. If one or more of these bits are set, an error in packet reception is indicated, and MSBI 146 flushes the received packet from receive FIFO 923 and discards it, at step 1506. If the EOP bit is set, MSBI 146 merely throws away the word or words that it has read out of receive FIFO 923. If the EOP bit is not set, MSBI 146 reads receive FIFO 923 and discards all read words until it detects that EOP bit of status register 916 has been set. MSBI 146 then returns to step 598.

If the EOP bit or one of the ERR bits is not found to be set at step 1505, MSBI 146 checks whether the received packet is a "restart" packet, at step 1507. A restart packet is a packet whose purpose is to clear skip flag 312 of an output queue 144 to restart processing of that output queue 144 by MSBI 146. A restart packet is identified by a special code in destination port ID word 322 of a packet. It carries no data except for a word identifying port 202 on destination processor 101 whose associated output queue 144 is to be "reawakened". Hence, at step 1507, MSBI 146 checks word 322 to determine whether it includes the special code. If so, MSBI 146 reads the remainder of the packet—consisting of words 324-328—from receive FIFO 923, at step 1508 of FIG. 20, by performing five word read operations on the memory address to which FIFO 923 is mapped.

As was mentioned above, the last received word of the packet is accompanied by an EOP bit, and any received word that resulted in an RNACK signal being sent by BIC 110 is accompanied by an SFERR or SPERR bit. Reading of a word accompanied by one of these bits from receive FIFO 923 results in setting of the corresponding bit of status register 916. An attempt to read beyond the word accompanied by the EOP bit results in setting of the EOPERR bit of status register 916 and indicates that field 332 of packet control word 320 does not correspond to the actual packet length. MSBI 146 therefore reads status register 916 to determine whether EOP bit is not set, or SPERR bit or SFERR bit or EOPERR bit is set, at step 1509. If so, an error in reception of the packet is indicated, and MSBI 146 discards the packet, at step 1510, and then returns to step 598.

If no error in reception is indicated at step 1509, MSBI 146 determines from the packet which port 202 the packet is addressed to, accesses that port's port structure 380 to determine from output queue pointer 381 thereof which output queue 144 corresponds to the port, and then accesses and clears skip flag 312 of that output queue 144, at step 1511. MSBI 146 then triggers output queue processing of FIGS. 8-11, at step 1512, by setting output pending flag 307 of output queue control structure 300. To acknowledge proper receipt of the restart packet, MSBI 146 calls the routine of FIG. 21 to send a "quick" message to the sender of the restart packet, at step 1547. MSBI 146 then returns to step 598.

If the received packet is determined at step 1507 of FIG. 18 to not be a restart packet, MSBI 146 checks toggle bit field 331 of packet control word 320 of the received packet, to determine if its value is proper, at step 1513. MSBI 146 uses DEST PORTID word 322 of the received packet to determine which is the destination port 202 for the packet, and accesses channel type indicator 385 of port structure 380 of that port 202 to determine whether channel 201 associated with that port 202 is a kernel channel or a user channel. If channel 201 is a user channel, MSBI 146 accesses input queue toggle 384 of port structure 380 to read the one toggle bit value stored thereby. If channel 201 is a kernel channel, MSBI 146 accesses input queue toggle 384 of port structure 380 to read from among the plurality of toggle bit values stored thereby the one corresponding to processor 101 that was the source of the packet. MSBI 146 determines the source processor 101 from sending BIC ID field 333 of packet control word 320. MSBI 146 then compares the value of the toggle bit obtained from input queue toggle 384 of accessed structure 380 with the value of toggle bit field 331 of received packet control word 320 to determine if they are equal. If they are not equal, the value of toggle bit field 331 is improper.

Improper toggle bit field 331 value is an indication that an ACK (acknowledgment) "quick" message sent by this processor 101 to the sending processor 101 to acknowledge receipt of a packet had not been received by sending processor 101, the consequence being that sending processor 101 retransmitted the packet. Hence, this packet has now been received twice by MSBI 146, so it is not neeeded. MSBI 146 therefore flushes the received packet from receive FIFO 923, at step 1526. MSBI 146 does so by reading receive FIFO 923 and discarding all read words until it detects that EOP bit of status register 916 has been set. MSBI 146 then checks the SFERR, SPERR, and EOPERR bits of status register 916 to determine whether BIC 110 has sent an RNACK signal to the sending processor 101 upon receipt of this packet, at step 1527. If at least one of these bits is set, an RNACK signal has been sent to inform the sending MSBI 146 of reception problems—receive FIFO 923 overflow, detection of a parity error on the received packet, or an attempt to read past the last packet word—and the sending MSBI 146 will repeat transmission of the packet sometime in the future. No further notification of sending processor 101 is made, and MSBI 146 returns to step 598.

If neither the SFERR bit nor the SPERR bit nor the EOPERR bit is found to be set at step 1527, an RNACK signal has not been sent to MSBI 146 of sending processor 101. MSBI 146 of receiving processor 101 therefore calls the routine of FIG. 21 to send an ACK "quick" message to sending processor 101 to advise it of (previous) successful reception of the packet, at step 1502. MSBI 146 then returns to step 598.

Returning to step 1513 of FIG. 18, if the check indicates that the received toggle bit value is proper, MSBI 146 checks whether input queue 143 of port 202 identified by DEST PORTID word 322 of the received packet is full, at step 1514. MSBI 146 accesses input queue pointer 382 of port structure 380 of destination port 202 to determine which is the input queue 143 of this port 202. MSBI 146 then compares values of pointers 352 and 353 of that input queue 143 to determine if they are equal. If so, input queue 143 is full. MSBI 146 therefore flushes the received packet from receive FIFO 923, at step 1530 of FIG. 19, in the manner of step 1526. MSBI 146 then checks whether an RNAK signal had been sent in conjunction with receipt of this packet, at step 1531, in the manner of step 1527. If so, MSBI 146 merely returns to step 598. But if RNACK has not been sent, MSBI 146 sets input queue full flag 348 of queue 143, at step 1529, to mark queue 143 as being full. Flag 348 is a count flag, and MSBI 146 sets it to the value held by low mark indicator 349. MSBI 146 also calls the routine of FIG. 21 to send a negative acknowledgment (NACK) quick message to the sender of the just-processed packet, at step 1532. MSBI 146 then returns to step 598.

Returning to step 1514 of FIG. 18, if input queue 143 is determined not to be full, MSBI 146 transfers buffer data words 1023 of the received packet from receive FIFO 923 to a buffer in the memory of processor 101, at step 1516, by means of DMA transfer. The buffer is identified by buffer address word 355 of input queue data entry 354 pointed to by the queue's load pointer 352. MSBI 146 performs a DMA transfer of as many words as are specified by buffer size field 332 of packet control word 320. MSBI 146 then reads user control words 324-327 from receive FIFO 923 and stores them in the corresponding words of input queue data entry 354, at step 1517. MSBI 146 also reads time stamp word 328 from receive FIFO 923 and stores it in a temporary location, at step 1501.

MSBI 146 now checks the EOP, SFERR, SPERR and EOPERR bits of status register 916 to determine if one of the ERR bits is set, or if the EOP bit is not set, at step 1518. Either condition indicates an error in reception of the packet, as was explained in conjunction with step 1509 of FIG. 20, and in response thereto MSBI 146 discards the received packet, at step 1550. Activities at step 1550 include reading receive FIFO 923 until an EOP bit is encountered, if the EOP bit of register 916 was found not to be set at step 1518. MSBI 146 then returns to step 598.

Because MSBI 146 has not advanced load pointer 352 of input queue 143, no flushing of data entry 354 of input queue 143 or of the buffer pointed to by buffer address word 355 is required. Furthermore, if SPERR or SFERR bit of status register 916 was set, the RNACK signal that had been sent by BIC 110 will cause processor 101 that was the source of the packet to resend the packet. If EOP bit was not set or EOPERR bit was set, lack of receipt of a "quick" message will cause processor 101 that was the source of the packet to resend the packet. In either case, the packet will eventually be resent to this destination processor 101.

If no error in reception is indicated by the check at step 1518, MSBI 146 extracts the packet control word from the temporary storage location and stores it in word 320 of input queue data entry 354, at step 1519. MSBI 146 then advances load pointer 352 of input queue 143, at step 1520, functionally to place contents of the just-filled data entry 354 on input queue 143. MSBI 146 then checks process waiting flag 350 and dequeue type indicator 358 of input queue 143 to determine if either a process or the interrupt handler, respectively, is waiting on this input queue 143, at step 1521. If so, MSBI 146 clears flag 350, at step 1522 of FIG. 20, and then notifies facility 141 of receipt of the packet, by means of response queue 142, at steps 1523-1525, in the manner discussed for steps 604-606 of FIG. 9.

Figure 21:
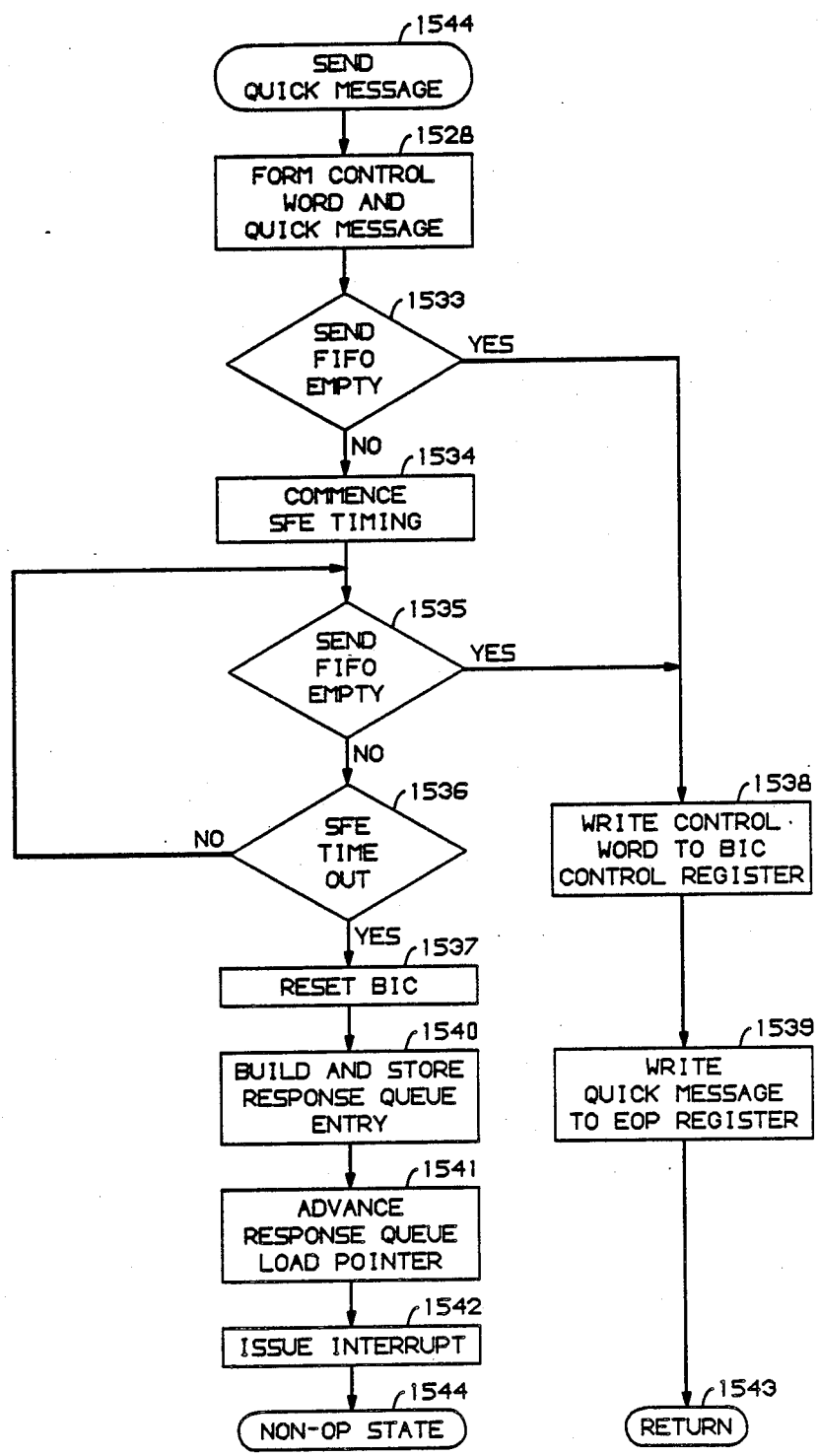
FIG. 21 is a flow diagram of the "send quick message" routine of the MSBI of the system of FIG. 1.

If it is determined at step 1521 of FIG. 19 that no process is waiting on this input queue 143, or following step 1525 of FIG. 20, MSBI 146 calls the routine of FIG. 21 to send to processor 101 that was the source of the received packet an ACK "quick" message, at step 1545. MSBI 146 then calls the routine of FIG. 22, at step 1546, to process the time stamp that was put aside at step 1501 of FIG. 19. Finally, MSBI 146 returns to step 598.

FIG. 21 flowcharts the routine used by MSBI 146 to send a quick message to a source processor 101 in response to a packet received therefrom. As part of the call of the routine, at step 1544, MSBI 146 specifies a quick message sequence number which it obtains from field 334 of packet control word 320 of the received packet, the sending BIC ID obtained from field 333 of word 320 of the received packet, and whether the packet is an ACK or a NACK. In response to the call, the routine forms at step 1528 a control word that is similar to control word 323 of an output queue data entry 317. The routine enters in word 323 as destination BIC ID the received sending BIC ID, plus a flag specifying a "quick" message. At step 1528, the routine also forms a "quick" message, shown in FIG. 14, entering therein the received quick message sequence number, the ID of BIC 110 of this processor 101, and the specified quick message type. The routine then waits for send FIFO 921 to become empty, at steps 1533-1536, in the manner of steps 608-611 of FIG. 9. If the SFE timeout period times out before send FIFO 921 becomes empty, the routine resets BIC 110 and creates a response queue 142 entry 362 and issues an interrupt to interface facility 141 to inform it thereof, at steps 1537-1542, in the manner described for steps 619 and 604-606 of FIG. 9. The routine then enters, at step 1544, a non-operational state equivalent to the state of step 640 of FIG. 9.

When send FIFO 921 is empty, the routine writes the control word to BIC control register 913, at step 1538 of FIG. 21. The routine then writes the "quick" message to BIC EOP register 917, at step 1539. The routine then returns to the point from which it was called, at step 1543.

Figure 22:
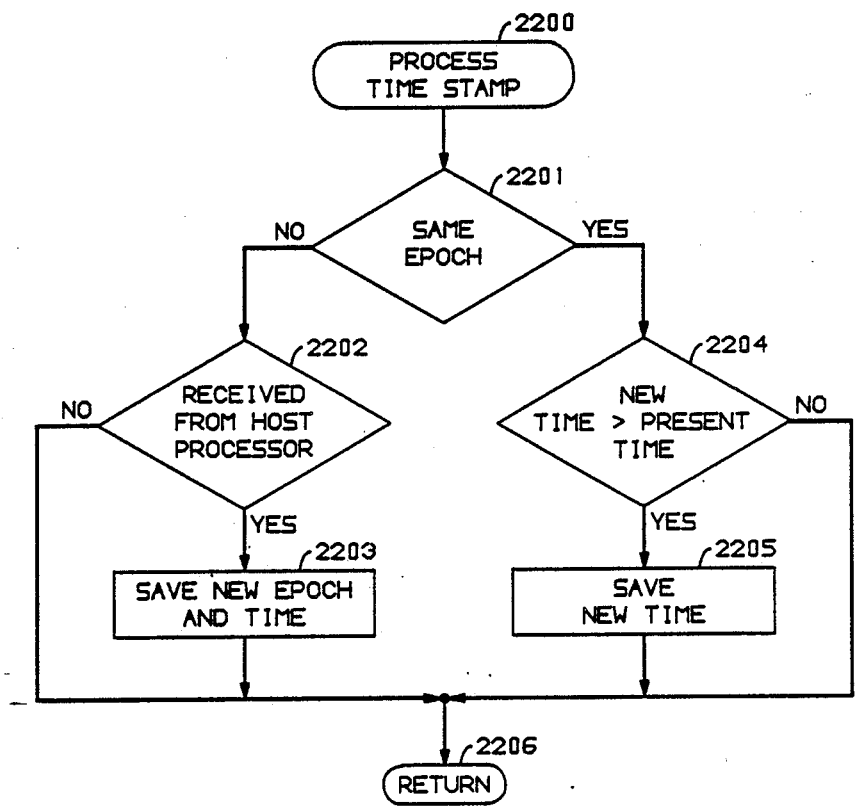
FIG. 22 is a flow diagram of the "process time stamp" routine of the MSBI of the system of FIG. 1.

FIG. 22 flowcharts the code segment used by MSBI 146 to process the time stamp. Time stamp word 328 comprises a plurality of bits carrying time data, and a single bit indicating either the same or a different "epoch". A time value cannot repeat itself in a single epoch but may do so in different epochs. Time in the system of FIG. 1 flows out from only one processor 101 designated as the "host" processor. While any processor 101 can replace its present time with the time stamp value received from any other processor 101, only "host" processor 101 can increment time in the system of FIG. 1. Between receipt of time stamps from other processors, time "stands still" for any non-host processor 101.

At step 2200, MSBI 146 specifies to this code segment the address of the temporary location in which time stamp 328 is stored, and the sending BIC ID obtained from field 333 of word 320 of the received packet. In response to the call, the routine compares the value of the epoch bit of word 328 with the value of the epoch bit of the time that processor 101 is presently using, to determine if both times are of the same epoch, at step 2201. If the epoch bit values are the same, it means that the epoch is the same, and the routine compares the value of the time data field of word 328 with the time value that processor 101 is presently using, at step 2204.

If the value of the time data field of word 328 is greater than the time value presently being used, the routine discards the value presently used and replaces it with the value of the time data field of word 328, at step 2205, thereby updating the processor's time. The routine then returns to the point from which it was called, at step 2206. If the value of the time data field of word 328 is not greater than the time value presently being used, the routine merely returns to the point from which it was called, at step 2206, thereby effectively discarding the time value received via word 328.

If at step 2201 it is determined that the epochs are different, the routine checks the sending BIC ID received as part of the call to determine if the time stamp was received from "host" processor 101, at step 2202. If not, the code merely returns to the point from which it was called, at step 2206, thereby effectively discarding the time value received via word 328. If the time stamp was received from "host" processor 101, the code discards the time and epoch values presently used and replaces them with the values received from the "host" processor, at step 2203. The code then returns to the point from which it was called, at step 2206.

Figure 23:
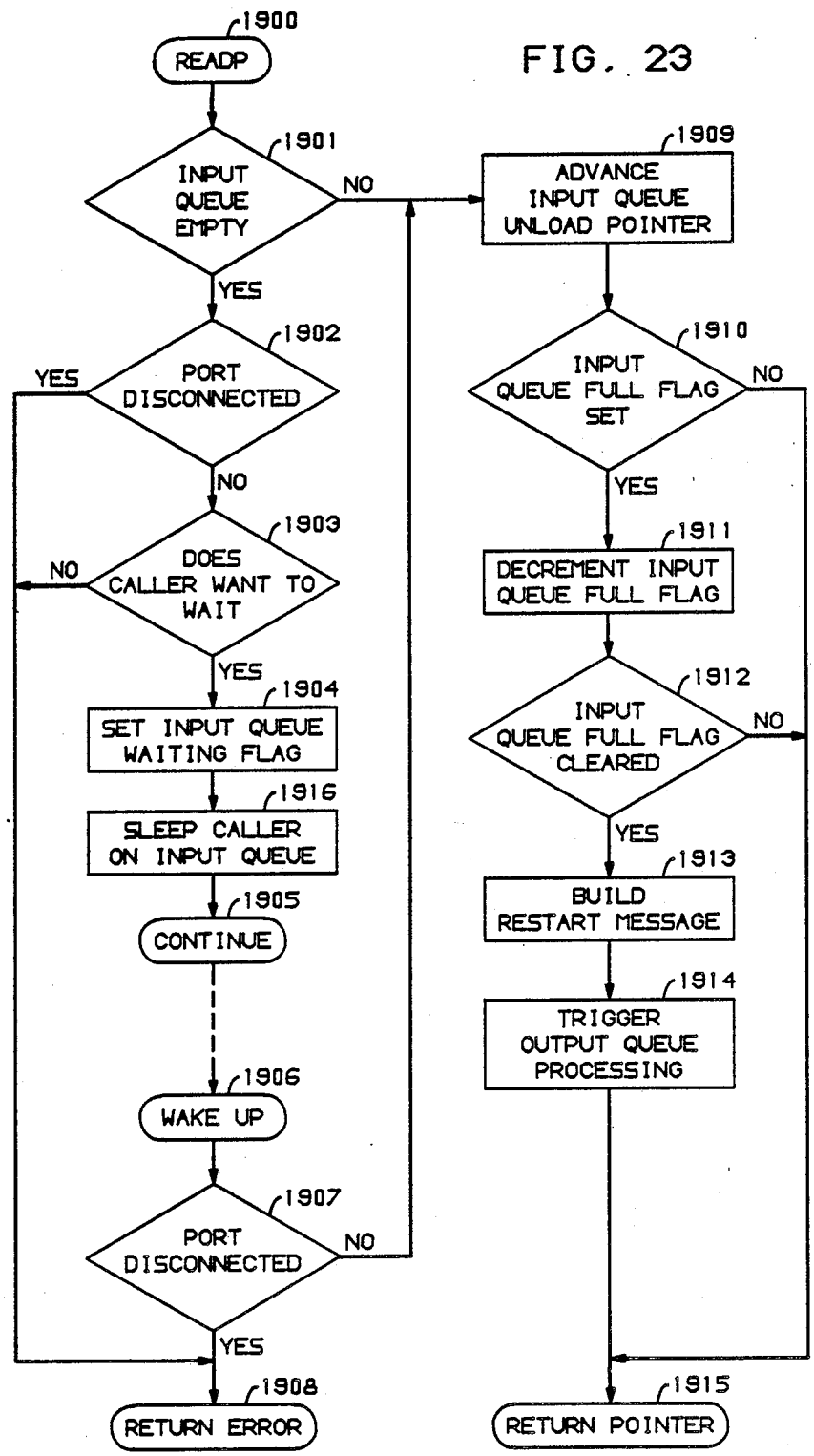
FIG. 23 is a flow diagram of the operation of an interface facility 141 of the system of FIG. 1 in responding to a READP call.

FIG. 23 flowcharts operation of interface facility 141 in receiving a packet from another processor 101 and illustrates use thereby of input queues 143 of queue structure 145.

A user process 140 wishing to obtain data from a packet received from another processor 101 calls facility 141 via a READP call, at step 1900. As part of the call, user process 140 specifies port 202 from which it wants to obtain the data, and, for ports 202 of kernel channels also specifies the ID of source BIC 110. In response to the call, interface facility 141 first checks whether that port's input queue 143 is empty or whether it contains any received information to satisfy the call, at step 1901. Interface facility 141 accesses input queue pointer 382 of port structure 380 of designated port 202 to determine which input queue 143 is associated with designated port 202. Interface facility 141 then accesses pointers 352 and 353 of that input queue 143 and compares them. If unload pointer 353 points to entry 354 immediately preceding entry 354 pointed to by load pointer 352, input queue 143 is empty, and interface facility 141 checks whether associated port 202 is disconnected, at step 1902, by checking status indicator 387 of the port's port structure 380. If entry 387 indicates that port 202 is disconnected, interface facility 141 returns to calling process 140 with an error indication, at step 1908.

If port 202 is not indicated to be disconnected, at step 1902, interface facility checks parameters of the call that it received at step 1900 to determine whether calling process 140 wants to sleep on the queue and wait for input to arrive, at step 1903. If not, interface facility 141 returns to calling process 140 with an error indication, at step 1908. If calling process 140 wishes to wait, interface facility 141 sets process waiting flag 350 of input queue 143, at step 1904, to indicate that a process is sleeping on this input queue 143. Interface facility 141 then puts the calling process to sleep, at step 1916, in a conventional UNIX system manner. Activities involved in putting a process to sleep include saving the processor state at the time the process is put to sleep, and appending the ID of the process to a list of sleeping processes associated with the address of this input queue 143. Interface facility 141 then continues with other operations, at step 1905, such as responding to, and processing, another call from another process 140.

When receipt of a packet results in MSBI 146 creating a data entry 354 in an input queue 143 on which a process is waiting, MSBI 146 issues an interrupt (see step 1525 of FIG. 20). The interrupt is received by interface facility 141 and processed in the manner shown in FIG. 24 and discussed below. As part of the processing, the sleeping process is reawakened. Included in awakening and resuming execution of a sleeping process is restoration of the processor state to what it had been at the time the process was put to sleep. This act resumes execution of interface facility 141 at step 1906. Interface facility 141 again checks status indicator 387 of port structure 380 of the input queue's associated port 202 to determine whether the port has been marked as disconnected, at step 1907. If so, interface facility 141 returns to the awakened process 140 with an error indication, at step 1908.

If port 202 is not found to be disconnected at step 1907, or if input queue 143 is not found to be empty at step 1901, interface facility 141 reads input queue data entry 354 pointed to by the input queue's unload pointer 353, and then advances the pointer 353 to point to the next entry 354, at step 1909. Interface facility 141 then checks input queue full flag 348 to determine whether input queue 143 has been flagged as being full, at step 1910. Flag 348 is a count flag, and interface facility 141 checks at step 1910 whether flag 348 has a non-zero value. If so, flag 348 is considered to be set, and interface facility 141 decrements flag 348, at step 1911, to reflect the fact that a data entry 354 has been removed from input queue 143 at step 1909. Interface facility then rechecks flag 348 to determine whether it has been decremented to zero, at step 1912. If so, it is an indication that enough entries 354 have been removed from input queue 143 and queue 143 is ready to receive new entries 354. Hence, interface facility 141 constructs a "restart" message, discussed previously, in a data entry 317 of output queue 144 identified by output queue pointer 381 of the port's port structure 380, at step 1913. MSBI 146 then sets task flag 305 of output queue control structure 300 to trigger output queue 144 processing, thereby to send the restart message to processor 101 at the other end of the port's associated channel 201, at step 1914.

Following step 1914, or if the value of flag 348 of input queue 143 is determined to be non-zero at step 1912 or zero at step 1910, interface facility 141 returns to calling process 140 with buffer address word 355 of input queue 143 data entry 354 that it read at step 1909, at step 1915.

Response by interrupt handler of interface facility 141 to receipt of an interrupt from MSBI 146 is illustrated in FIG. 24. As was discussed previously, issuance of the interrupt is preceded by construction of a user entry 362 in response queue 142. In response to receipt of the interrupt, at step 2000, the interrupt handler checks whether response queue 142 is empty, at step 2001, by comparing load pointer 360 with unload pointer 361. If unload pointer 361 points to an entry 362 immediately preceding the entry 362 pointed to by load pointer 360, queue 142 is empty, and the interrupt handler returns to the activities of interface facility 141 from which it was interrupted, at step 2002. If queue 142 is not empty (as it will not be immediately following receipt of the interrupt), the interrupt handler reads response queue user entry 362 pointed to by unload pointer 361, at step 2003, and then advances pointer 361, at step 2004, to point to the next response entry 362. The interrupt handler then examines tag word 370 of the read response entry 362 to determine the entry type, at step 2005.

If the entry type is input, it is a notification of receipt of a packet for an input queue 143 that either has its process waiting indicator 350 set or dequeues input synchronously in the interrupt handler. An input queue 143 is dequeued synchronously when it has service routines—as opposed to a process—associated therewith, which routines the interrupt handler calls directly. The interrupt handler examines data word 371 of response entry 362 to identify subject input queue 143, accesses channel type indicator 385 of port structure 380 of port 202 associated with identified input queue 143, and examines indicator 385 to determine whether channel 201 associated with port 202 is an asynchronous channel that is being dequeued synchronously, at step 2006. If so, the interrupt handler calls the waiting routine, at step 2007, and then returns to step 2001. If not, the interrupt handler wakes up the process or processes sleeping on input queue 143 and identified by a list of process ID's associated with input queue 143, at step 2008. The process or processes are awakened in a conventional manner. The interrupt handler then returns to step 2001.

If at step 2005 the entry type is determined to be output, the response entry 362 is a notice of sending of a packet corresponding to a data entry 317 of an output queue 144 that had its process waiting flag 313 set. The interrupt handler then examines data word 371 of response entry 362 to identify that output queue 143 and wakes up processes 140 sleeping on that output queue 143, at step 2008. The interrupt handler then returns to step 2001.

If at step 2005 the entry type is determined to be other than input or output, the interrupt handler processes entry 362 as is appropriate for that entry type, at step 2009. Illustratively, the interrupt handler causes response entry 362 to be printed on a terminal of processor 101. The interrupt handler then returns to step 2001.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

What is claimed is:

1. A communication system comprising:
   an arbitrated-access communication medium; and
   a plurality of stations communicatively connected to and sharing use of the medium, each station comprising
   first means, for seeking exclusive access to the medium according to either one of a first and a second priority associated with the station, each station's associated first and second priority being different from the first and second priorities, respectively, of the other stations, and the second priority of every station being higher than the first priority of every station;
   second means, responsive to gaining of sought access by the first means, for transmitting messages of either one of a first and a second predetermined type on the medium to other stations, and responsive to not gaining of sought access by the first means for forbearing transmitting on the medium;
   third means, for storing messages of the first type received on the medium from other stations;
   fourth means, for storing, separately from messages of the first type, messages of the second type received on the medium from other stations;
   fifth means, for causing the first means to seek medium access according to the first priority and causing the second means to transmit a message of the first type; and
   sixth means, responsive to a message stored in the third means and received from another station, for causing the first means to seek medium access according to the second priority and causing the second means to transmit a message of the second type to the other station.

2. A station for a system having an arbitrated-access communication medium and a plurality of stations communicatively connected to and sharing use of the medium, the station comprising:
   first means, for seeking exclusive access to the medium according to either one of a first and a second priority associated with the station, each station's associated first and second priority being different from the first and second priorities, respectively, of the other stations, and the second priority of being higher than the first priority;
   second means, responsive to gaining of sought access by the first means, for transmitting messages of either one of a first and a second predetermined type on the medium to other stations, and responsive to not gaining of sought access by the first means, for forbearing transmitting on the medium;
   third means, for storing messages of the first type received on the medium from other stations;
   fourth means, for storing, separately from messages of the first type, messages of the second type received on the medium from other stations;
   fifth means, for causing the first means to seek medium access according to the first priority and causing the second means to transmit a message of the first type; and
   sixth means, responsive to a message stored in the third means and received from another station, for causing the first means to seek medium access according to the second priority and causing the second means to transmit a message of the second type to the other station.

3. The station of claim 2 further comprising:
   seventh means for causing retransmission of a transmitted message of the first type if the fourth means do not receive a message of the second type within a predetermined time interval from transmission of the message of the first type by the second means.

4. A station for a system having a communication medium and a plurality of stations communicatively connected to the medium, the station comprising:
   first means, for seeking exclusive access to the medium according to either one of a first and a second priority associated with the station, the second priority being higher than the first priority;
   second means, responsive to gaining of sought access by the first means, for transmitting messages of either one of a first and a second predetermined type on the medium to other stations;
   third means, for storing messages of the first type received on the medium from other stations;
   fourth means, for storing, separately from messages of the first type, messages of the second type received on the medium from other stations;
   fifth means, for causing the first means to seek medium access according to the first priority and causing the second means to transmit a message of the first type;
   sixth means, responsive to a message stored in the third means and received from another station, for causing the first means to seek medium access according to the second priority and causing the second means to transmit a message of the second type to the other station;
   seventh means, cooperative with the third means, for determining whether a message being stored in the third means should be retransmitted for a first reason;
   eighth means, cooperative with the seventh means, for sending a first signal on the medium when it is determined that a message should be retransmitted; and
   ninth means, responsive to receipt of a first signal on the medium, for causing retransmission of a message of the first type transmitted by the second means during receipt of the first signal.

5. The station of claim 4 further comprising:
   tenth means for discarding a message stored by the third means if it is determined that the discarded message should be retransmitted.

6. The station of claim 4 further comprising:
   tenth means for storing information representing messages removed from the third means; wherein the sixth means comprise
   eleventh means for removing from the third means a received message stored therein, twelfth means for determining whether the removed message should be discarded for a second reason, thirteenth means for selectively storing information representing the removed message in the tenth means if it is not determined that the removed message should be discarded, and for discarding the removed message if it is determined that the removed message should be discarded, and fourteenth means for causing the first means to seek medium access according to the second priority and causing the second means to transmit a message of the second type to a second station from which the removed message was received, if the seventh means have not determined that the removed message should be retransmitted.

7. The station of claim 6 wherein
the twelfth means comprise
fifteenth means for determining whether the removed message should be retransmitted for a second reason, the second reasons including the first reasons; wherein
the thirteenth means comprise
sixteenth means for storing information representing the removed message in the tenth means if the fifteenth means have not determined that the removed message should be retransmitted, and for discarding the removed message if the fifteenth means determined that the removed message should be retransmitted; and wherein
the fourteenth means comprise
means for causing the first means to seek medium access according to the second priority and causing the second means to transmit to the second station a message of the second type conveying a positive acknowledgment of the removed message if the fifteenth means have not determined that the removed message should be retransmitted, and for causing the first means to seek medium access according to the second priority and causing the second means to transmit to the second station a message of the second type conveying a negative acknowledgment of the removed message if the fifteenth means determined that the removed message should be retransmitted and the eighth means did not send a first signal on the medium during receipt of the affected message.

8. The station of claim 7 further comprising:
a plurality of seventeenth means, each for association with a different tenth means of other stations, for storing information representing messages for transmission by the second means to associated tenth means,
the station further comprising
eighteenth means, responsive to storing by the fourth means of a message, for removing the stored message from the fourth means to determine which acknowledgment is conveyed thereby;
nineteenth means, cooperative with the eighteenth means, for deleting from a tenth means information representing the message acknowledged by the message removed from the fourth means, if the acknowledgment is determined to be positive, and for postponing transmission of messages represented by information stored by a tenth means storing information representing the message acknowledged by the message removed from the fourth means, if the acknowledgment is determined to be negative.

9. A station for a system having a communication medium and a plurality of stations communicatively connected to the medium, the station comprising:

first means, for seeking access to the medium according to either one of a first and a second priority associated with the station, the second priority being higher than the first priority;

second means, responsive to gaining of sought access by the first means, for transmitting messages of either one of a first and a second predetermined type on the medium to other stations;

third means, for storing messages of the first type received on the medium from other stations;

fourth means, for storing, separately from messages of the first type, messages of the second type received on the medium from other stations;

fifth means, for causing the first means to seek medium access according to the first priority and causing the second means to transmit a message of the first type;

sixth means, responsive to a message stored in the third means and received from another station, for causing the first means to seek medium access according to the second priority and causing the second means to transmit a message of the second type to the other station, and including means for determining whether a received message stored in the third means should be transmitted, and means, cooperative with the determining means, for causing the first means to seek medium access according to the second priority and causing the second means to transmit to a second station from which the stored message was received a message of the second type conveying a positive acknowledgment of the message stored in the third means and received from the second station, if it is not determined that the acknowledged message should be retransmitted, and further for causing the first means to seek medium access according to the second priority and causing the second means to transmit to the second station a message of the second type conveying a negative acknowledgment of the message stored in the third means and received from the second station, if it is determined that the acknowledged message should be retransmitted; and seventh means responsive to a message stored by the fourth means and conveying a negative acknowledgment of a message for causing retransmission of the negatively-acknowledged message.

10. The station of claim 9 further comprising
eighth means for discarding a message stored by the third means if it is determined that the discarded message should be retransmitted.

11. The station of claim 9 further comprising
eighth means for storing information representing messages removed from the third means; wherein
the determining means comprise
means for removing from the third means a message stored therein,
means for determining whether the removed message should be retransmitted, and
means for selectively storing information representing the removed message in the eighth means is it is not determined that the removed message should be retransmitted, and further for discarding the removed message if it is determined that the removed message should be retransmitted.

12. The station of claim 11 further comprising;
a plurality of ninth means, each for association with a different eighth means of other stations, for storing information representing messages for transmission by the second means to associated eighth means;
wherein the seventh means comprise
means, responsive to storing by the fourth means of a message, for removing the stored message from the fourth means to determine which acknowledgment is conveyed thereby,
means, cooperative with the removing means, for deleting from a ninth means information representing the message acknowledged by the message removed from the fourth means, if the acknowledgment is determined to be positive, and for postponing transmission of messages represented by information stored by a ninth means storing information representing the message acknowledged by the message removed from the fourth means, if the acknowledgment is determined to be negative.

13. A station for a system having a communication medium defining a plurality of logical communication paths, and further having a plurality of stations connected to the medium, the station comprising:
a plurality of output queues, each for association with different logical paths extending to other stations of the plurality of stations of the communication system, each output queue for storing entries, each entry defining a packet of a first type for transmission across an associated logical path;
a plurality of input queues, each for association with different logical paths extending from output queues of other stations of the plurality of stations of the communication system, each input queue for storing entries each representing a packet of the first type received across an associated logical path;
first memory means for buffering packets for transmission on the medium;
second memory means for buffering packets of the first type received on the medium;
third memory means for buffering packets of a second type received on the medium;
first operative means, for storing in the first memory means a packet defined by an entry of an output queue and identifying the output queue's associated logical path;
second operative means, responsive to storage in the first memory means of a packet of the first type, for contending for access to the medium according to a first priority associated with the station, and further responsive to storage in the first memory means of a packet of a second type, for contending for access to the medium according to a second priority associated with the station and higher than the first priority;
third operative means, responsive to gaining of access to the medium by the second operative means, for transmitting on the medium the packet stored in the first memory means;
fourth operative means, responsive to receipt on the medium of a packet of the first type, for storing the received packet in the second memory means, and responsive to receipt on the medium of a packet of the second type, for storing the received packet in the third memory means;

fifth operative means, for removing a received packet from the second memory means and in response to the removed packet forming in the input queue associated with the logical path identified by the removed packet an entry representing the removed packet; and
sixth operative means, cooperative with the fifth operative means, for storing in the first memory means a packet of the second type acknowledging the removed packet.

14. The system of claim 13 further comprising:
seventh operative means, for removing a received packet from the third memory means and in response to the removed packet deleting from an output queue an entry defining the acknowledged packet.

15. The station of claim 13 wherein a fifth operative means comprise
means for determining whether the removed packet should be discarded,
means, cooperative with the determining means, for storing in the input queue associated with the logical path identified by the removed packet an entry defining the removed packet, if it is not determined that the removed packet should be discarded, and for discarding the removed packet, if it is determined that the removed packet should be discarded; wherein
the sixth means comprise
means, cooperative with the determining means, for storing in the first memory means a packet of the second type conveying a positive acknowledgment of the removed packet, if it is not determined that the removed packet should be discarded, and for storing in the first memory means a packet of the second type conveying a negative acknowledgment of the removed packet, if it is determined that the removed packet should be discarded;
the station further comprising
seventh operative means, for removing a received packet of the second type from the third memory means and in response to the removed packet deleting from an output queue an entry defining the acknowledged packet of the first type, if the removed packet conveys a positive acknowledgment, and further in response to the removed packet postponing transmission of packets defined by entries of the output queue, if the removed packet conveys a negative acknowledgement.

16. The station of claim 15 wherein
the determining means comprise
means for determining whether the input queue associated with the logical path identified by the removed packet of the first type is full.

17. The station of claim 13 wherein the fifth operative means comprise
means for determining whether the input queue associated with the logical path identified by the removed packet is full of entries,
means, cooperative with the determining means, for storing in the input queue an entry defining the removed packet, if the input queue is determined not to be full, and for discarding the removed packet, if the input queue is determined to be full; wherein
the sixth means comprise
means, cooperative with the determining means, for storing in the first memory means a packet of the second type conveying a positive acknowledgment of the removed packet, if the input queue is determined not to be full, and for storing in the first memory means a packet of the second type conveying a negative acknowledgment of the removed packet, if the input queue is determined to be full;

the station further comprising seventh operative means for removing a received packet from the third memory means and in response to the removed packet deleting from an output queue an entry defining the acknowledged packet of the first type, if the removed packet conveys a positive acknowledgment, and further in response to the removed packet postponing transmission of the packets defined by entries of the output queue, if the removed packet conveys a negative acknowledgment.

18. The station of claim 17 wherein the seventh operative means are responsive to the removed packet, for preventing the first operative means from storing in the first memory means packets defined by entries of the output queue, if the removed packet conveys a negative acknowledgment.

19. The station of claim 13 wherein each output queue is for storing entries each including a pointer to data stored outside of the queue and included in the defined packet; and wherein each input queue is for storing entries each including a pointer to data stored outside of the queue and included in the represented packet.

20. The station of claim 13 wherein the fourth operative means comprise means for examining the received packet to detect errors, means for monitoring the second memory means to detect overflow, means, cooperative with the examining means and the monitoring means, for sending a first signal on the medium, if at least one of error and overflow are detected, wherein the fifth operative means include means responsive to the removed packet for forming in the input queue associated with the logical path identified by the removed packet an entry representing the removed packet, if error and overflow were not detected by the examining means and the monitoring means during reception of the removed packet, and for discarding the removed packet, if at least one of error and overflow were detected by the examining means and the monitoring means during reception of the removed packet;

the station further comprising seventh operative means, responsive to receipt of a first signal on the medium, for causing retransmission of a packet of the first type transmitted on the medium by the third operative means during reception of the first signal.

21. The station of claim 13 further comprising:

seventh operative means, cooperative with the third memory means, for causing retransmission of a packet of the first type if the third memory means do not buffer a packet acknowledging the transmitted packet of the first type within a predetermined time interval from transmission of the packet of the first type by the third operative means.

22. The station of claim 13 wherein the fourth operative means comprise means for examining the removed packet to detect errors, means for monitoring the second memory means to detect overflow, means, cooperative with the examining means and the monitoring means, for sending a first signal on the medium if at least one of error and overflow are detected, wherein the fifth operative means include means for determining occurrence of at least one of a plurality of first conditions including error and second memory overflow, means for determining whether the input queue associated with the logical path identified by the removed packet is full, means, cooperative with the queue overflow determining means and the first condition determining means, for forming in the input queue associated with the logical path identified by the removed packet an entry representing the removed packet, if a first condition is determined not to have occurred and the input queue is determined not to be full, and for discarding the removed packet, if at least one of (a) a first condition is determined to have occurred and (b) the input queue is determined to be full; wherein the sixth means comprise means, cooperative with the determining means and the first-signal sending means, for storing in the first memory means a packet of the second type conveying a positive acknowledgment of the removed packet, if a first condition is determined not to have occurred and the input queue is determined not to be full, and for storing in the first memory means a packet of the second type conveying a negative acknowledgment of the removed packet, if the first signal was not sent and the input queue is determined to be full;

the station further comprising seventh operative means, responsive to receipt of a first signal on the medium, for causing retransmission of a packet of the first type transmitted on the medium by the third operative means during reception of the first signal;

eighth operative means, for removing a received packet from the third memory means and in response to the removed packet deleting from an output queue an entry defining the acknowledged packet of the first type, if the removed packet conveys a positive acknowledgment, and further in response to the removed packet postponing transmission of packets defined by entries of the output queue, if the removed packet conveys a negative acknowledgment; and ninth operative means, for causing retransmission of a packet of the first type transmitted on the medium by the third operative means, if a first signal is not received while the packet is being transmitted and a packet of the second type acknowledging the transmitted packet of the first type is not received within a predetermined time interval following transmission of the packet of the first type.

23. A method of communication between a plurality of stations each for transmitting and receiving messages of both a first and a second type, connected to and sharing use of an arbitrated-access communication medium, comprising the steps of (a) seeking exclusive access from a first station to the medium according to a first priority and a second priority which are associated with the first station, the first priority of the first station being lower than the second priority of the first station;
(b) upon gaining access to the medium, transmitting a message of the first type from the first station on the medium to a second station while other stations forbear transmitting on the medium;
(c) receiving the transmitted message of the first type at the second station in first storage means, the second station having the first storage means for receiving messages of the first type and having second storage means for separately receiving messages of the second type;
(d) in response to receipt of the message of the first type, seeking exclusive access from the second station to the medium according to a second priority of a first and the second priority which are associated with the second station, the first priority of the second station being lower than the second priority of the second station and each station's associated first and second priority being different from the first and second priorities, respectively, of the other station;
(e) upon gaining access to the medium, transmitting a message of the second type from the second station on the medium to the first station while other stations forbear transmitting on the medium; and
(f) receiving the transmitted message of the second type at the first station in a second storage means, the first station having first storage means for receiving messages of the first type and the second storage means for separately receiving messages of the second type.

24. The method of claim 23 wherein
all second priorities are higher than all first priorities.

25. The method of claim 23 further comprising the step of
(g) repeating steps (a) and (b) at the first station to retransmit a transmitted message of the first type to the second station if step (f) does not occur within a predetermined time interval from step (b).

26. A method of communicating between a plurality of stations each for transmitting and receiving messages of both a first and a second type, connected to a communication medium, comprising the steps of:
(a) seeking access from a first station to the medium according to a first priority of the first and a second priority which are associated with the first station, the first priority being lower than the second priority;
(b) upon gaining access to the medium, transmitting a message of the first type from the first station on the medium to a second station;
(c) receiving the transmitted message of the first type at the second station in first storage means, the second station having the first storage means for receiving messages of the first type and having second storage means for separately receiving messages of the second type;
(d) in response to receipt of the message of the first type, seeking access from the second station to the medium according to a second priority of a first and the second priority which are associated with the second station, the first priority being lower than the second priority;
(e) upon gaining access to the medium, transmitting a message of the second type from the second station on the medium to the first station, including the steps of
(f) determining whether the message received by the first storage means of the second station is affected by a condition of a first type,
(g) upon gaining access to the medium, transmitting from the second station to the first station a message of the second type conveying a positive acknowledgment of the received message of the first type, if the received message is determined to not be affected by a condition of the first type; and
(h) upon gaining access to the medium, transmitting from the second station to the first station a message of the second type conveying a negative acknowledgment of the received message of the first type, if the received message is determined to be affected by a condition of the first type; and
(i) receiving the transmitted message of the second type at the first station in a second storage means, the first station having first storage means for receiving messages of the first type and the second storage means for separately receiving messages of the second type.

27. The method of claim 26 further comprising the step of
(j) in response to determining at step (g) that the received message is affected, discarding the affected message at the second station.

28. The method of claim 26 further comprising the step of
(i) in response to receipt of the message of the second type conveying a negative acknowledgment, repeating steps (a) and (b) at the first station to retransmit the negatively-acknowledged transmitted message to the second station.

29. The method of claim 28 further comprising the steps of
(j) while receiving the transmitted message at step (c), determining whether the received message is affected by a condition of a second type;
(h) sending a first signal on the medium to the first station if the received message is determined at step (j) to be affected;
(l) in response to receipt of the first signal, repeating steps (a) and (b) at the first station to retransmit the transmitted message to the second station; and wherein
step (i) comprises the step of
transmitted to the first station a message of the second type conveying a negative acknowledgment if the received message is determined at step (g) to be affected by a condition of the first type and a first signal was not sent to the first station while the received message was being received.

30. A method of communicating between a plurality of stations having storage means and input and output queues and connected to a communicating medium defining a plurality of logical communication paths, comprising the steps of:
(a) forming in first storage means of a first station a packet of a first type from an entry of an output queue of a plurality of output queues each associated with different logical paths extending from the first station to other stations, each output queue for storing entries each defining a packet of a first type for transmission across an associated logical path, the packet identifying the queue's associated logical path;

(b) in response to formation of the packet in the first storage means, seeking access at the first station to the medium according to a first priority of the first and a higher second priority which are associated with the first station;

(c) upon gaining access to the medium, transmitting the formed packet from the first storage means on the medium to a second station;

(d) receiving the transmitted packet of the first type at the second station in a second storage means, the second station having the second storage means for receiving packets of the first type and having third storage means for separately receiving packets of a second type;

(e) forming an entry, representing a packet of the first type received in the second storage means, in an input queue associated with the logical path identified by the received packet, the input queue being of a plurality of input queues each associated with different logical communication paths extending to the second station from output queues of other stations, each input queue for storing entries each representing a packet of the first type received across an associated logical path;

(f) forming in first storage means of the second station a packet of a second type acknowledging the packet of the first type received in the second storage means;

(g) in response to formation of the packet in the first storage means, seeking access at the second station to the medium according to a second priority of a lower first and the second priority which are associated with the second station;

(h) upon gaining access to the medium, transmitting the formed packet from the first storage means on the medium to the first station;

(i) receiving the transmitted packet of the second type at the first station in third storage means, the first station having a second storage means for separately receiving packets of the second type; and (j) in response to receipt of the packet of the second type, deleting from an output queue an entry representing the packet of the first which was acknowledged by the received packet of the second type.

31. The method of claim 30 further comprising the step of (k) repeating steps (a)–(c) at the first station to retransmit a transmitted packet of the first type to the second station, if step (i) does not occur within a predetermined time interval from step (c).

32. The method of claim 30 wherein step (e) comprises the steps of (k) determining whether the packet of the first type received in the second storage means is affected by a condition of a first type;

(l) forming the input queue entry if the received packet is determined to not be affected by a condition of the first type; and (m) discarding the received packet if the received packet is determined to be affected by a condition of the first type; wherein step (f) comprises the steps of (n) forming in the first storage means of the second station a packet of a second type acknowledging the received packet of the first type and conveying a positive acknowledgment thereof, if the received packet is determined to not be affected by a condition of the first type;

(o) forming in the first storage means of the second station a packet of the second type acknowledging the received packet of the first type and conveying a negative acknowledgment thereof, if the received packet is determined to be affected by a condition of the first type; and wherein step (j) comprises the steps of (p) deleting from an output queue associated with the logical path identified by the acknowledged packet of the first type an entry representing the acknowledged packet, if the received packet of the second type conveys a positive acknowledgment; and (q) delaying formation in the first storage means of packets from entries of the output queue associated with the logical path identified by the acknowledged packet of the first type, if the received packet of the second type conveys a negative acknowledgment.

33. The method of claim 32 further comprising the steps of (r) while receiving the transmitted message at step (d), determining whether the received message is affected by a condition of a second type;

(s) sending a first signal on the medium to the first station, if the received message is determined at step (r) to be affected;

(t) in response to receipt of the first signal, repeating steps (a)–(c) at the first station to retransmit the transmitted packet to the second station; and wherein step (o) comprises the step of forming in the first storage means the packet of the second type conveying a negative acknowledgment, if the received packet is determined to be affected by a condition of the first type and a first signal was not sent to the first station while the received message was being received.

34. The method of claim 33 wherein conditions of the first type include error and overflow of the second storage means, and wherein conditions of the second type include the input queue associated with the communication path identified by the received packet being full.

* * * * *